US006709358B2

(12) United States Patent
Raghavan et al.

(10) Patent No.: US 6,709,358 B2
(45) Date of Patent: Mar. 23, 2004

(54) FAMILY OF MULTI-SPEED TRANSMISSION MECHANISMS HAVING THREE PLANETARY GEARSETS AND FIVE TORQUE-TRANSMITTING MECHANISMS

(75) Inventors: Madhusudan Raghavan, West Bloomfield, MI (US); Chi-Kuan Kao, Troy, MI (US); Patrick Benedict Usoro, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/955,742

(22) Filed: Sep. 19, 2001

(65) Prior Publication Data

US 2003/0054917 A1 Mar. 20, 2003

(51) Int. Cl.[7] ................................................. F16H 3/66
(52) U.S. Cl. ........................................ 475/275; 475/296
(58) Field of Search ................................ 475/275, 276, 475/280, 282, 284, 286, 296

(56) References Cited

U.S. PATENT DOCUMENTS

| | | | |
|---|---|---|---|
| 4,070,927 A | 1/1978 | Polak | 74/765 |
| 5,106,352 A | 4/1992 | Lepelletier | 475/280 |
| 5,599,251 A | 2/1997 | Beim et al. | 475/275 |
| 5,879,264 A | 3/1999 | Raghavan et al. | 475/280 |
| 5,951,432 A | 9/1999 | Wehking et al. | 475/280 |
| 5,984,825 A | 11/1999 | Hebbale et al. | 475/286 |
| 5,997,429 A | 12/1999 | Raghavan et al. | 475/280 |
| 6,007,450 A | 12/1999 | Raghavan et al. | 475/286 |
| 6,056,665 A | 5/2000 | Raghavan et al. | 475/280 |
| 6,071,208 A | 6/2000 | Koivunen | 475/275 |
| 6,083,135 A | 7/2000 | Baldwin et al. | 475/276 |
| 6,425,841 B1 * | 7/2002 | Haka | 475/275 |

FOREIGN PATENT DOCUMENTS

EP          1033510          9/2000

* cited by examiner

Primary Examiner—Rodney H. Bonick
Assistant Examiner—Dennis Abdelnour
(74) Attorney, Agent, or Firm—Kathryn A. Marra

(57) ABSTRACT

The family of transmissions has a plurality of members that can be utilized in powertrains to provide at least six forward speed ratios and one reverse speed ratio. The transmission family members each include three planetary gearsets and five torque-transmitting mechanisms. One of the torque-transmitting mechanisms is a stationary type torque-transmitting mechanism, or brake, and the remaining four of the torque-transmitting mechanisms are of the rotating type torque-transmitting mechanisms, or clutches. The power-train includes an engine and torque converter that is continuously connected to at least one member of the planetary gear arrangement and an output member that is continuously connecting with another of the planetary gear members. At least one other planetary gear member is continuously connected with the transmission housing. The five torque-transmitting mechanisms provide interconnections between various gear members and with either the transmission housing, the input or output shaft, in some instances, and operated in combinations of two to establish at least six forward speed ratios.

10 Claims, 16 Drawing Sheets

| | Ratios | 58 | 50 | 52 | 54 | 56 |
|---|---|---|---|---|---|---|
| Reverse | -4.84 | X | | | | X |
| Neutral | 0 | X | | | | |
| 1 | 5.42 | X | X | | | |
| 2 | 2.95 | | X | | | X |
| 3 | 1.9 | | X | X | | |
| 4 | 1.34 | | X | | X | |
| 5 | 1 | | | X | X | |
| 6 | 0.72 | X | | | X | |

(X=engaged clutch)

$\dfrac{\text{Ring Gear}}{\text{Sun Gear}}$ Tooth Ratio : $\dfrac{R_1}{S_1} = 2.99$, $\dfrac{R_2}{S_2} = 1.70$, $\dfrac{R_3}{S_3} = 1.85$

| Ratio Spread | 7.5 |
|---|---|
| Ratio Steps | |
| Rev/1 | -0.89 |
| 1/2 | 1.84 |
| 2/3 | 1.55 |
| 3/4 | 1.43 |
| 4/5 | 1.34 |
| 5/6 | 1.38 |

| | Ratios | 158 | 150 | 152 | 154 | 156 |
|---|---|---|---|---|---|---|
| Reverse | -1.88 | X | | | X | |
| Neutral | 0 | X | | | | |
| 1 | 3.62 | X | | X | | |
| 2 | 2.23 | | | X | X | |
| 3 | 1.52 | | | X | | X |
| 4 | 1 | | | | X | X |
| 5 | 0.78 | | X | | | X |
| 6 | 0.56 | X | | | | X |

(X=engaged clutch)

$\dfrac{\text{Ring Gear}}{\text{Sun Gear}}$ Tooth Ratio : $\dfrac{R_1}{S_1}$=2.33, $\dfrac{R_2}{S_2}$=1.88, $\dfrac{R_3}{S_3}$=1.93

| Ratio Spread | 6.5 |
|---|---|
| Ratio Steps | |
| Rev/1 | -0.52 |
| 1/2 | 1.62 |
| 2/3 | 1.47 |
| 3/4 | 1.52 |
| 4/5 | 1.29 |
| 5/6 | 1.4 |

| | Ratios | 258 | 250 | 252 | 254 | 256 |
|---|---|---|---|---|---|---|
| Reverse | -1.88 | X | | | | X |
| Neutral | 0 | X | | | | |
| 1 | 3.62 | X | | X | | |
| 2 | 2.23 | | | X | | X |
| 3 | 1.52 | | | X | X | |
| 4 | 1 | | | | X | X |
| 5 | 0.78 | | X | | X | |
| 6 | 0.56 | X | | | X | |

(X=engaged clutch)

$\frac{\text{Ring Gear}}{\text{Sun Gear}}$ Tooth Ratio : $\frac{R_1}{S_1}$ 2.33, $\frac{R_2}{S_2}$ =1.88, $\frac{R_3}{S_3}$ =1.93

| Ratio Spread | 6.5 |
|---|---|
| Ratio Steps | |
| Rev/1 | -0.52 |
| 1/2 | 1.62 |
| 2/3 | 1.47 |
| 3/4 | 1.52 |
| 4/5 | 1.29 |
| 5/6 | 1.4 |

| | Ratios | 358 | 350 | 352 | 354 | 356 |
|---|---|---|---|---|---|---|
| Reverse | -2.81 | X | | | X | |
| Neutral | 0 | X | | | | |
| 1 | 3.82 | X | X | | | |
| 2 | 2.55 | | X | | | X |
| 3 | 1.61 | X | | | | X |
| 4 | 1 | | | | X | X |
| 5 | 0.82 | X | | X | | |
| 6 | 0.65 | | | | X | X |

(X=engaged clutch)

$\frac{Ring\ Gear}{Sun\ Gear}$ Tooth Ratio : $\frac{R_1}{S_1}$ 1.86, $\frac{R_2}{S_2}=1.88$, $\frac{R_3}{S_3}=2.00$

| Ratio Spread | 5.93 |
|---|---|
| Ratio Steps | |
| Rev/1 | -0.74 |
| 1/2 | 1.5 |
| 2/3 | 1.58 |
| 3/4 | 1.61 |
| 4/5 | 1.22 |
| 5/6 | 1.27 |

| | Ratios | 458 | 450 | 452 | 454 | 456 |
|---|---|---|---|---|---|---|
| Reverse | -1.83 | X | | | | X |
| Neutral | 0 | X | | | | |
| 1 | 3.5 | X | X | | | |
| 2 | 2.37 | X | | X | | |
| 3 | 1.6 | | X | X | | |
| 4 | 1 | | | X | X | |
| 5 | 0.8 | | X | | X | |
| 6 | 0.6 | | X | | | X |

(X=engaged clutch)

$\frac{\text{Ring Gear}}{\text{Sun Gear}}$ Tooth Ratio : $\frac{R_1}{S_1} = 1.50$, $\frac{R_2}{S_2} = 1.68$, $\frac{R_3}{S_3} = 1.83$

| Ratio Spread | 5.81 |
|---|---|
| Ratio Steps | |
| Rev/1 | -0.52 |
| 1/2 | 1.48 |
| 2/3 | 1.48 |
| 3/4 | 1.6 |
| 4/5 | 1.25 |
| 5/6 | 1.33 |

| | Ratios | 558 | 550 | 552 | 554 | 556 |
|---|---|---|---|---|---|---|
| Reverse | -2.93 | X | | | | X |
| Neutral | 0 | X | | | | |
| 1 | 5.71 | X | | X | | |
| 2 | 4.03 | X | X | | | |
| 3 | 2.6 | | X | X | | |
| 4 | 1.56 | | X | | | X |
| 5 | 1.27 | | X | | X | |
| 6 | 1 | | | | X | X |

(X=engaged clutch)

$\frac{\text{Ring Gear}}{\text{Sun Gear}}$ Tooth Ratio : $\frac{R_1}{S_1}=1.87$, $\frac{R_2}{S_2}=1.60$, $\frac{R_3}{S_3}=2.93$

| Ratio Spread | 5.71 |
|---|---|
| Ratio Steps | |
| Rev/1 | -0.51 |
| 1/2 | 1.42 |
| 2/3 | 1.55 |
| 3/4 | 1.67 |
| 4/5 | 1.22 |
| 5/6 | 1.27 |

| | Ratios | 658 | 650 | 652 | 654 | 656 |
|---|---|---|---|---|---|---|
| Reverse | -1.53 | X | | | X | |
| Neutral | 0 | X | | | | |
| 1 | 2.88 | X | | | | X |
| 2 | 1.66 | | | X | | X |
| 3 | 1 | | | | X | X |
| 4 | 0.7 | | | X | X | |
| 5 | 0.57 | | X | | X | |
| 6 | 0.45 | X | | | X | |

(X=engaged clutch)

$\frac{\text{Ring Gear}}{\text{Sun Gear}}$ Tooth Ratio : $\frac{R_1}{S_1}$ 1.87, $\frac{R_2}{S_2} = 1.88$, $\frac{R_3}{S_3} = 1.88$

| Ratio Spread | 6.43 |
|---|---|
| Ratio Steps | |
| Rev/1 | -0.53 |
| 1/2 | 1.74 |
| 2/3 | 1.66 |
| 3/4 | 1.43 |
| 4/5 | 1.22 |
| 5/6 | 1.28 |

| | Ratios | 758 | 750 | 752 | 754 | 756 |
|---|---|---|---|---|---|---|
| Reverse | -1.53 | X | | X | | |
| Neutral | 0 | X | | | | |
| 1 | 2.88 | X | | | | X |
| 2 | 1.66 | | | X | | X |
| 3 | 1 | | | | X | X |
| 4 | 0.7 | | | X | X | |
| 5 | 0.57 | | X | | X | |
| 6 | 0.45 | X | | | X | |

(X=engaged clutch)

$\dfrac{\text{Ring Gear}}{\text{Sun Gear}}$ Tooth Ratio : $\dfrac{R_1}{S_1}$ 1.87, $\dfrac{R_2}{S_2}=1.88$, $\dfrac{R_3}{S_3}=1.88$

| Ratio Spread | 6.43 |
|---|---|
| Ratio Steps | |
| Rev/1 | -0.53 |
| 1/2 | 1.74 |
| 2/3 | 1.66 |
| 3/4 | 1.43 |
| 4/5 | 1.22 |
| 5/6 | 1.28 |

| | Ratios | 858 | 850 | 852 | 854 | 856 |
|---|---|---|---|---|---|---|
| Reverse | -1.28 | | | X | | X |
| Neutral | 0 | | | | | X |
| 1 | 2.49 | | X | | | X |
| 2 | 1.5 | X | | | | X |
| 3 | 1 | | | | X | X |
| 4 | 0.67 | X | | | X | |
| 5 | 0.53 | | | X | X | |
| 6 | 0.4 | X | | X | | |

(X=engaged clutch)

$\frac{Ring\ Gear}{Sun\ Gear}$ Tooth Ratio : $\frac{R_1}{S_1}=2.00,\ \frac{R_2}{S_2}=2.01,\ \frac{R_3}{S_3}=1.51$

| Ratio Spread | 6.24 |
|---|---|
| Ratio Steps | |
| Rev/1 | -0.51 |
| 1/2 | 1.66 |
| 2/3 | 1.5 |
| 3/4 | 1.5 |
| 4/5 | 1.27 |
| 5/6 | 1.32 |

| | Ratios | 958 | 950 | 952 | 954 | 956 |
|---|---|---|---|---|---|---|
| Reverse | -1.28 | | | X | | X |
| Neutral | 0 | | | | | X |
| 1 | 2.49 | | X | | | X |
| 2 | 1.5 | X | | | | X |
| 3 | 1 | | | | X | X |
| 4 | 0.67 | X | | | X | |
| 5 | 0.53 | | | X | X | |
| 6 | 0.4 | X | | X | | |

(X=engaged clutch)

$\frac{Ring\ Gear}{Sun\ Gear}$ Tooth Ratio : $\frac{R_1}{S_1}=2.00,\ \frac{R_2}{S_2}=2.01,\ \frac{R_3}{S_3}=1.51$

| Ratio Spread | 6.24 |
|---|---|
| Ratio Steps | |
| Rev/1 | -0.51 |
| 1/2 | 1.66 |
| 2/3 | 1.5 |
| 3/4 | 1.5 |
| 4/5 | 1.27 |
| 5/6 | 1.32 |

| | Ratios | 1058 | 1050 | 1052 | 1054 | 1056 |
|---|---|---|---|---|---|---|
| Reverse | -1.51 | | X | | X | |
| Neutral | 0 | | | | | |
| 1 | 2.6 | X | | | | X |
| 2 | 1.4 | X | | | X | |
| 3 | 1 | | | X | X | |
| 4 | 0.65 | X | | X | | |
| 5 | 0.53 | | X | X | | |
| 6 | 0.43 | X | X | | | |

(X=engaged clutch)

$\frac{Ring\ Gear}{Sun\ Gear}$ Tooth Ratio : $\frac{R_1}{S_1}$ 1.51, $\frac{R_2}{S_2}$=3.00, $\frac{R_3}{S_3}$=1.60

| Ratio Spread | 5.99 |
|---|---|
| Ratio Steps | |
| Rev/1 | -0.58 |
| 1/2 | 1.86 |
| 2/3 | 1.4 |
| 3/4 | 1.54 |
| 4/5 | 1.23 |
| 5/6 | 1.22 |

| | Ratios | 1158 | 1150 | 1152 | 1154 | 1156 |
|---|---|---|---|---|---|---|
| Reverse | -1.67 | | X | | | X |
| Neutral | 0 | | | | | |
| 1 | 2.6 | X | | | X | |
| 2 | 1.41 | X | | | | X |
| 3 | 1 | | | | X | X |
| 4 | 0.66 | X | | | X | |
| 5 | 0.55 | | X | | X | |
| 6 | 0.46 | X | | X | | |

(X=engaged clutch)

$\dfrac{\text{Ring Gear}}{\text{Sun Gear}}$ Tooth Ratio : $\dfrac{R_1}{S_1}$ 1.67, $\dfrac{R_2}{S_2}$ =2.93, $\dfrac{R_3}{S_3}$ =1.60

| Ratio Spread | 5.69 |
|---|---|
| Ratio Steps | |
| Rev/1 | -0.64 |
| 1/2 | 1.85 |
| 2/3 | 1.41 |
| 3/4 | 1.51 |
| 4/5 | 1.2 |
| 5/6 | 1.2 |

|  | Ratios | 1258 | 1250 | 1252 | 1254 | 1256 |
|---|---|---|---|---|---|---|
| Reverse | -5.52 | X | X |  |  |  |
| Neutral | 0 | X |  |  |  |  |
| 1 | 10.1 | X |  |  |  | X |
| 2 | 6.1 | X |  | X |  |  |
| 3 | 3.73 |  |  | X |  | X |
| 4 | 2.72 |  | X | X |  |  |
| 5 | 1.9 |  | X |  |  | X |
| 6 | 1.66 |  | X |  | X |  |
| 7 | 1 |  |  |  | X | X |

(X=engaged clutch)

$\frac{Ring\ Gear}{Sun\ Gear}$ Tooth Ratio : $\frac{R_1}{S_1}$ 2.33, $\frac{R_2}{S_2}$ =3.00, $\frac{R_3}{S_3}$ =2.03

| Ratio Spread | 6.1(1/6) | 10.1(1/7) |
|---|---|---|
| Ratio Steps |  |  |
| Rev/1 | -0.55 | -0.55 |
| 1/2 | 1.66 | 1.66 |
| 2/3 | 1.63 | 1.63 |
| 3/4 | 1.37 | 1.37 |
| 4/5 | 1.43 | 1.43 |
| 5/6 | 1.15 | 1.15 |
| 6/7 | - | 1.66 |

| | Ratios | 1358 | 1350 | 1352 | 1354 | 1356 |
|---|---|---|---|---|---|---|
| Reverse | -2.21 | X | | | X | |
| Neutral | 0 | | | | | |
| 1 | 4 | | | X | | X |
| 2 | 2.38 | | | X | X | |
| 3 | 1.47 | X | | X | | |
| 4 | 1 | | X | X | | |
| 5 | 0.82 | X | X | | | |
| 6 | 0.67 | | X | | | X |
| 7 | 0.62 | | X | | X | |

(X=engaged clutch)

$\frac{\text{Ring Gear}}{\text{Sun Gear}}$ Tooth Ratio : $\frac{R_1}{S_1}$ 2.33, $\frac{R_2}{S_2}$ =1.58, $\frac{R_3}{S_3}$ =2.50

| Ratio Spread | 6(1/6) | 6.49(1/7) |
|---|---|---|
| Ratio Steps | | |
| Rev/1 | -0.55 | -0.55 |
| 1/2 | 1.68 | 1.68 |
| 2/3 | 1.61 | 1.61 |
| 3/4 | 1.47 | 1.47 |
| 4/5 | 1.21 | 1.21 |
| 5/6 | 1.24 | 1.24 |
| 6/7 | - | 1.08 |

| | Ratios | 1458 | 1450 | 1452 | 1454 | 1456 |
|---|---|---|---|---|---|---|
| Reverse | -3.62 | | X | | X | |
| Neutral | 0 | | X | | | |
| 1 | 6.27 | | X | | | X |
| 2 | 4.09 | X | | | | X |
| 3 | 2.83 | | | | X | X |
| 4 | 1.81 | | | X | | X |
| 5 | 1.5 | | | X | X | |
| 6 | 1.11 | X | | X | | |
| 7 | 1 | | | X | X | |

(X=engaged clutch)

$\frac{\text{Ring Gear}}{\text{Sun Gear}}$ Tooth Ratio : $\frac{R_1}{S_1}$ 1.83, $\frac{R_2}{S_2}$ 1.97, $\frac{R_3}{S_3}$ =2.93

| Ratio Spread | (1/6) 5.66 | (1/7) 6.27 |
|---|---|---|
| Ratio Steps | | |
| Rev/1 | -0.58 | -0.58 |
| 1/2 | 1.53 | 1.53 |
| 2/3 | 1.44 | 1.44 |
| 3/4 | 1.56 | 1.56 |
| 4/5 | 1.21 | 1.21 |
| 5/6 | 1.35 | 1.35 |
| 6/7 | - | 1.11 |

| | Ratios | 1558 | 1550 | 1552 | 1554 | 1556 |
|---|---|---|---|---|---|---|
| Reverse | -2.98 | X | X | | | |
| Neutral | 0 | X | | | | |
| 1 | 5.17 | X | | X | | |
| 2 | 3.45 | | X | X | | |
| 3 | 1.9 | | | X | | X |
| 4 | 1.43 | | | X | X | |
| 5 | 1 | | | | X | X |
| 6 | 0.85 | | X | | X | |
| 7 | 0.63 | X | | | X | |
| 8 | 0.55 | | X | | | X |

(X=engaged clutch)

$\frac{\text{Ring Gear}}{\text{Sun Gear}}$ Tooth Ratio : $\frac{R_1}{S_1}$ 2.33, $\frac{R_2}{S_2}$ =2.31, $\frac{R_3}{S_3}$ =2.98

| Ratio Spread | 6.07(1/6) | 8.16(1/7) | 9.41(1/8) |
|---|---|---|---|
| Ratio Steps | | | |
| Rev/1 | -0.58 | -0.58 | -0.58 |
| 1/2 | 1.5 | 1.5 | 1.5 |
| 2/3 | 1.82 | 1.82 | 1.82 |
| 3/4 | 1.33 | 1.33 | 1.33 |
| 4/5 | 1.43 | 1.43 | 1.43 |
| 5/6 | 1.17 | 1.17 | 1.17 |
| 6/7 | · | 1.34 | 1.34 |
| 7/8 | · | · | 1.15 |

FAMILY OF MULTI-SPEED TRANSMISSION MECHANISMS HAVING THREE PLANETARY GEARSETS AND FIVE TORQUE-TRANSMITTING MECHANISMS

TECHNICAL FIELD

The present invention relates to power transmissions and, more particularly, to a family of power transmissions having three planetary gearsets that are controlled by five torque-transmitting devices to provide at least six forward speed ratios and one reverse ratio.

BACKGROUND OF THE INVENTION

Passenger vehicles include a powertrain that is comprised of an engine, multi-speed transmission and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point, during cruising, other than the most efficient point. Therefore manually shifted (countershaft transmissions) were the most popular.

With the advent of three and four speed automatic transmissions, the automatic shifting (planetary gear) transmission increased in popularity with the motoring public. These transmissions improve the operating performance and fuel economy of the vehicle. The increased number of speed ratios reduces the step size between ratios and therefore improves the shift quality of the transmission by making the ratio interchanges substantially imperceptible to the operator under normal vehicle acceleration. It has been suggested that the number of forward speed ratios be increased to five and even six speeds. This has been accomplished in many heavy truck powertrains. Six speed transmissions are disclosed in U.S. Pat. No. 4,070,927 issued to Polak on Jan. 31, 1978, U.S. Pat. No. 6,071,208 issued to Koivunen on Jun. 6, 2000, U.S. Pat. No. 5,106,352 issued to Lepelletier on Apr. 21, 1992, and U.S. Pat. No. 5,599,251 issued to Beim and McCarrick on Feb. 4, 1997.

Six speed transmissions offer several advantages over four and five speed transmissions, including improved vehicle acceleration and improved fuel economy. While many trucks employ power transmissions, such as Polak, having six or more forward gear ratios, passenger cars are still manufactured with three and four speed automatic transmissions and relatively few five or six speed devices due to the size and complexity of these transmissions. The Polak transmission provides six forward speed ratios with three planetary gear sets, two clutches and three brakes. The Koivunen and Beim patents utilizes six torque transmitting devices including four brakes and two clutches to establish the six forward speed ratios and another reverse ratio. The Lepelletier employs three planetary gear sets, three clutches and two brakes to provide six forward speeds. One of the planetary gear sets is positioned and operated to establish two fixed speed input members for the remaining two planetary gear sets.

SUMMARY OF THE INVENTION

It is an object of the present invention to provide an improved family of transmissions having three planetary gearsets controlled to provide at least six forward speed ratios.

In one aspect of the present invention, the family of transmissions has three planetary gearsets each of which includes a first, second and third member, which members may comprise a sun gear, a ring gear or a planet carrier assembly member. In another aspect of the present invention, each of the planetary gearsets may be of the single pinion type or of the double pinion type. In yet another aspect of the present invention, the first member of the first planetary gearset and the first member of the second planetary gearset are continuously interconnected by a fixed interconnection member.

In still another aspect of the present invention, a second interconnecting member continuously interconnects a second member of the second planetary gearset with a first member of the third planetary gearset. In yet still another aspect of the present invention, a second member of the first planetary gearset is continuously connected with a stationary transmission member, such as a housing or transmission case. In a yet a further aspect of the present invention, each family member incorporates an input shaft which is continuously connected with a member of one of the planetary gearsets and an output shaft which is continuously connected with another member of one of the planetary gearsets.

In a still further aspect of the present invention, the five torque-transmitting mechanisms comprise four rotating type torque-transmitting mechanisms and one stationary type torque-transmitting mechanism. In still a further aspect of the present invention, the stationary torque-transmitting mechanism selectively connects a member of the first, second or third planetary gearset with a stationary member of the transmission, such as a transmission housing. In yet still a further aspect of the present invention, a first of the rotating torque-transmitting mechanisms selectively connects a member of the first planetary gearset with either the input shaft, the output shaft, or a member of the second or third planetary gearset.

In another aspect of the present invention, a second of the rotating torque-transmitting mechanisms selectively interconnects a member of the second planetary gearset with either the input shaft, the output shaft, one of the fixed interconnecting members, or a member of the first or third planetary gearset. In a yet still further aspect of the present invention, a third of the rotating torque-transmitting mechanisms selectively connects a member of either the first, second or third planetary gearset with either the input shaft, the output shaft, or another member of the first, second or third planetary gearset. In yet still a further aspect of the present invention, a fourth of the rotating torque-transmitting mechanisms selectively interconnects a member of the first, second or third planetary gearset with either one of the fixed connecting members or another member of the first, second or third planetary gearset.

In still another aspect of the present invention, the five torque-transmitting mechanisms are selectively engageable in combinations of two to yield at least six forward speed ratios and one reverse ratio. In yet another aspect of the present invention, at least one family member is controlled by the torque-transmitting mechanism to establish eight forward speed ratios, and at least three of the family members are controlled by the torque-transmitting mechanisms to provide at least seven forward speed ratios.

DESCRIPTION OF AN EXEMPLARY EMBODIMENT

Figures 1, 2:
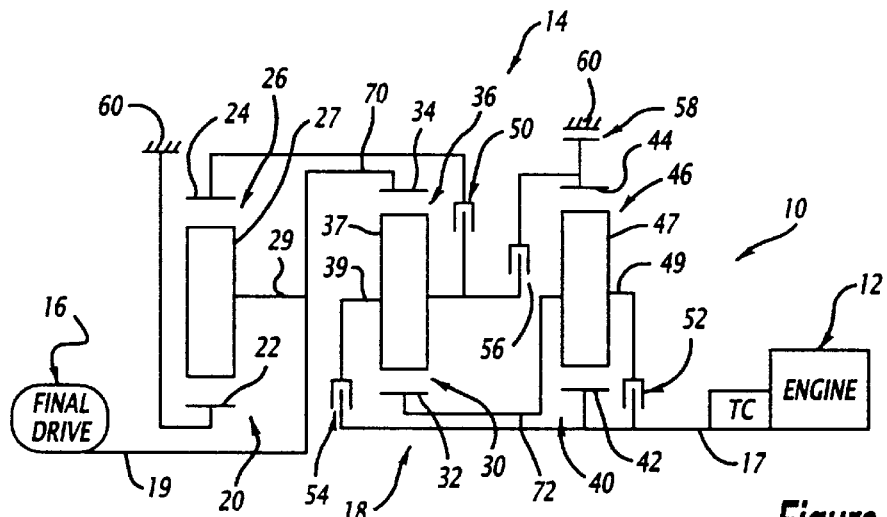
FIG. 1 is a schematic representation of a powertrain including a planetary transmission incorporating a family member of the present invention.
FIG. 2 is a truth table and chart of some of the operating characteristics of the powertrain shown in FIG. 1.

Referring to the drawings, wherein like characters represent the same or corresponding parts throughout the several views, there is seen in FIG. 1 a powertrain 10 having a conventional engine and torque converter 12, a planetary transmission 14, and a conventional final drive mechanism 16.

The planetary transmission 14 includes an input shaft 17 continuously connected with the engine and torque converter 12, a planetary gear arrangement 18, and an output shaft 19 continuously connected with the final drive mechanism 16. The planetary gear arrangement 18 includes three planetary gearsets 20, 30 and 40.

The planetary gearset 20 includes a sun gear member 22, a ring gear member 24, and a planet carrier assembly member 26. The planet carrier assembly member 26 includes a plurality of pinion gears 27 rotatably mounted on a carrier member 29 and disposed in meshing relationship with both the sun gear member 22 and the ring gear member 24.

The planetary gearset 30 includes a sun gear member 32, a ring gear member 34, and a planet carrier assembly member 36. The planet carrier assembly member 36 includes a plurality of pinion gears 37 rotatably mounted on a carrier member 39 and disposed in meshing relationship with both the sun gear member 32 and the ring gear member 34.

The planetary gearset 40 includes a sun gear member 42, a ring gear member 44, and a planet carrier assembly member 46. The planet carrier assembly member 46 includes a plurality of pinion gears 47 rotatably mounted on a carrier member 49 and disposed in meshing relationship with both the sun gear member 42 and the ring gear member 44.

The planetary gear arrangement 18 also includes five torque-transmitting mechanisms 50, 52, 54, 56 and 58. The torque-transmitting mechanisms 50, 52, 54, and 56 are of the rotating type torque-transmitting mechanisms, commonly termed clutches. The torque-transmitting mechanism 58 is a stationary type torque-transmitting mechanism, commonly termed a brake or reaction clutch.

The input shaft 17 is continuously connected with the sun gear member 42 and the output shaft 19 is continuously connected with the planet carrier assembly member 26 and the ring gear member 34 which are disposed in continuous communication with each other through a first interconnecting member 70. The planet carrier assembly member 46 and the sun gear member 32 are continuously interconnected by an interconnecting member 72. The sun gear member 22 is continuously connected with a transmission housing 60.

The planet carrier assembly member 46 and the sun gear member 32 are selectively connectible with the input shaft 17 through the torque-transmitting mechanism 52. The planet carrier assembly member 36 is selectively connectible with the ring gear member 24 through the torque-transmitting mechanism 50, with the input shaft 17 through the torque-transmitting mechanism 54, and with the ring gear member 44 through the torque-transmitting mechanism 56. The ring gear member 44 is selectively connectible with the transmission housing 60 through the torque-transmitting mechanism 58.

As seen in FIG. 2, and in particular the truth table disclosed therein, the torque-transmitting mechanisms are selectively engaged in combinations of two to provide six forward speed ratios and a reverse speed ratio. It should also be noted in the truth table that the torque-transmitting mechanism 58 remains engaged through a neutral condition, thereby simplifying the forward/reverse interchange.

To establish the reverse speed ratio, the torque-transmitting mechanisms 56 and 58 are engaged. The simultaneous engagement of these two torque-transmitting mechanisms will hold both the ring gear member 44 and the planet carrier assembly member 36 stationary. The planet carrier assembly member 46 and the sun gear member 32 are driven forwardly at a speed determined by the speed of sun gear member 42 and the ring gear/sun gear tooth ratio of the planetary gearset 40. The ring gear member 34 and therefore output shaft 19 are driven in reverse at a speed determined by the speed of the sun gear member 32 and the ring gear/sun gear tooth ratio of the planetary gearset 30. The overall numerical value of the reverse ratio is determined by the tooth ratios of the planetary gearsets 30 and 40.

The first forward speed ratio is established with the engagement of the torque-transmitting mechanisms 50 and 58. During the first forward speed ratio, the planet carrier assembly member 46 and therefore sun gear member 32 are driven forwardly at a speed determined by the speed of the sun gear member 42 and the ring gear/sun gear tooth ratio of the planetary gearset 40. The planet carrier assembly member 36 and ring gear member 24 are driven forwardly at a speed determined by the speed of sun gear member 32, the speed of ring gear member 34, and the ring gear/sun gear tooth ratio of the planetary gearset 30. The planet carrier assembly member 26, ring gear member 34, and output shaft 19 are driven forwardly at a speed determined by the speed of the ring gear member 24 and the ring gear/sun gear tooth ratio of the planetary gearset 20. The overall numerical value of the first forward speed ratio is determined by all three planetary gearsets 20, 30 and 40.

The second forward speed ratio is established with the engagement of the torque-transmitting mechanisms 50 and 56. The first to second interchange is a single transition shift. The planet carrier assembly member 46 and the sun gear member 32 are driven forwardly at a speed determined by the speed of sun gear member 42, the speed of ring gear member 44, and the ring gear/sun gear tooth ratio of the planetary gearset 40. The planet carrier assembly member 36 and the ring gear member 24 are driven forwardly at a speed determined by the speed of the sun gear member 32, the speed of ring gear member 34 and the ring gear/sun gear tooth ratio of the planetary gearset 30. The planet carrier assembly member 26, ring gear member 34, and output shaft 19 are driven forwardly at a speed determined by the speed of ring gear member 24 and the ring gear/sun gear tooth ratio of the planetary gearset 20. The overall numeric value of second forward speed ratio is determined by the tooth ratios of the planetary gearsets 20, 30 and 40.

The third forward speed ratio is established with the engagement of the torque-transmitting mechanisms 50 and 52. The second to third interchange is a single transition shift. With the engagement of torque-transmitting mechanism 52, the planet carrier assembly member 46 and sun gear member 32 are driven at the speed of the input shaft 17. The planet carrier assembly member 36 and ring gear member 24 are driven forwardly at a speed determined by the speed of the sun gear member 32, the speed of ring gear member 34, and the ring gear/sun gear tooth ratio of the planetary gearset 30. The planet carrier assembly member 26, the ring gear member 34, and the output shaft 19 are driven forwardly at a reduced speed determined by the speed of the ring gear member 24 and the ring gear/sun gear tooth ratio of the planetary gearset 20. The overall numeric value of the third forward speed ratio is determined by the tooth ratios of the planetary gearsets 20 and 30.

The fourth forward speed ratio is established with the engagement of the torque-transmitting mechanisms 50 and 54. This combination of torque-transmitting mechanism engagement provides for a direct connection with the input shaft 17 and the ring gear member 24. The planet carrier assembly member 26 and output shaft 19 are driven forwardly at a speed determined by the speed of ring gear member 24 and the ring gear/sun gear tooth ratio of the planetary gearset 20. The numerical value of the fourth forward speed ratio is determined by the ring gear/sun gear tooth ratio of the planetary gearset 20.

The fifth forward speed ratio is established with the engagement of the torque-transmitting mechanisms 52 and 54. With this combination of torque-transmitting mechanism engagements, the planetary gearsets 40 and 30 rotate in unison with the input shaft 17. Since the output shaft 19 is connected directly with the ring gear member 34, the output shaft 19 also rotates in unison with the input shaft. The fifth forward speed ratio therefore is a direct drive or a 1:1 ratio.

The sixth forward speed ratio is established with the engagement of the torque-transmitting mechanism 58 and the torque-transmitting mechanism 54. During the sixth forward speed ratio, the planet carrier assembly member 46 and therefore sun gear member 32 are driven forwardly at a speed determined by the speed of the sun gear member 42 and the ring gear/sun gear tooth ratio of the planetary gearset 40. The ring gear member 34 and therefore output shaft 19 are driven forwardly at a speed determined by the speed of the sun gear member 32, the speed of the planet carrier assembly member 36 (input), and the ring gear/sun gear tooth ratio of the planetary gearset 30. The overall numerical value of the sixth forward speed ratio is determined by the tooth ratios of the planetary gearsets 30 and 40.

As set forth above, the engagement schedule for the torque-transmitting mechanisms is set forth in the truth table of FIG. 2. This truth table also provides an example of speed ratios that are available utilizing the ring gear/sun gear tooth ratios given by way of example in FIG. 2. The R1/S1 value is the tooth ratio of the planetary gearset 20; the R2/S2 value is the tooth ratio of the planetary gearset 30; and the R3/S3 value is the tooth ratio of the planetary gearset 40. Utilizing these speed ratios given in the truth table can be attained. Also, the chart of FIG. 2 describes the ratio steps that are attained utilizing the sample of tooth ratios given. For example, the step ratio between the first and second forward ratios is 1.84, while the step ratio between the reverse and first forward ratio is 0.89.

Figures 3, 4:
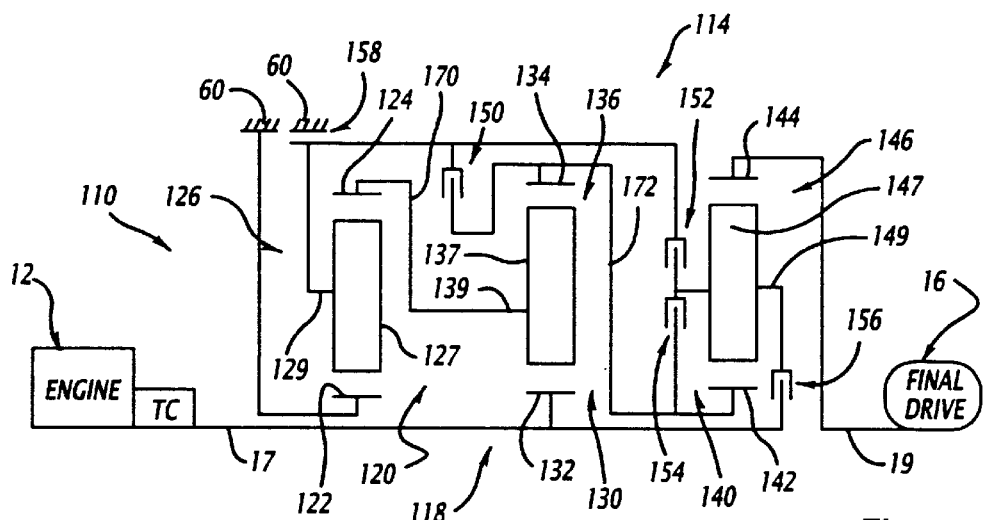
FIG. 3 is a schematic representation of a powertrain having a planetary transmission incorporating another family member of the present invention.
FIG. 4 is a truth table and chart depicting some of the operating characteristics of the powertrain shown in FIG. 3.

A powertrain 110, shown in FIG. 3, includes the engine and torque converter 12, a planetary transmission 114, and the final drive mechanism 16.

The planetary transmission 114 includes an input shaft 17 continuously connected with the engine and torque converter 12, a planetary gear arrangement 118, and an output shaft 19 continuously connected with the final drive mechanism 16. The planetary gear arrangement 118 includes three planetary gearsets 120, 130 and 140.

The planetary gearset 120 includes a sun gear member 122, a ring gear member 124 and a planet carrier assembly member 126. The planet carrier assembly member 126 includes a plurality of pinion gears 127 rotatably mounted on a carrier member 129 and disposed in meshing relationship with both the sun gear member 122 and the ring gear member 124.

The planetary gearset 130 includes a sun gear member 132, a ring gear member 134 and a planet carrier assembly member 136. The planet carrier assembly member 136 includes a plurality of pinion gears 137 rotatably mounted on a carrier member 139 and disposed in meshing relationship with both the sun gear member 132 and the ring gear member 134.

The planetary gearset 140 includes a sun gear member 142, a ring gear member 144 and a planet carrier assembly member 146. The planet carrier assembly member 146 includes a plurality of pinion gears 147 rotatably disposed on a carrier member 149 and meshing with both the sun gear member 142 and the ring gear member 144.

The planetary gear arrangement 118 also includes five torque-transmitting mechanisms 150, 152, 154, 156 and 158. The torque-transmitting mechanisms 150, 152, 154, and 156 are of the rotating type torque-transmitting mechanisms, commonly termed clutches. The torque-transmitting mechanism 158 is a stationary type torque-transmitting mechanism, commonly termed a brake or reaction clutch.

The input shaft 17 is continuously connected with the sun gear member 132, the output shaft 19 is continuously connected with the ring gear member 144, and the sun gear member 122 is continuously connected with the transmission housing 60. The ring gear member 124 and planet carrier assembly member 136 are continuously interconnected by an interconnecting member 170. The ring gear member 134 and sun gear member 142 are continuously interconnected by an interconnecting member 172. The planet carrier assembly member 126 is selectively connectible with the transmission housing 60 through the torque-transmitting mechanism 158, with the planet carrier assembly member 146 through the torque-transmitting mechanism 152, and with the interconnecting member 172 through the torque-transmitting mechanism 150. The planet carrier assembly member 146 is selectively connectible with the input shaft 17 through the torque-transmitting mechanism 156 and with the interconnecting member 172 through the torque-transmitting mechanism 154.

The truth table of FIG. 4 describes the engagement sequence utilized to provide six forward speed ratios and a reverse speed ratio in the planetary gear arrangement 118 shown in FIG. 3.

To establish the reverse speed ratio, the torque-transmitting mechanisms 154 and 158 are engaged. The engagement of torque-transmitting mechanism 154 creates a lock-up condition in the planetary gearset 140 such that the planetary gearset rotates as a unit. The engagement of torque-transmitting mechanism 158 holds the planetary gearset 120 and therefore planet carrier assembly member 136 stationary. The ring gear member 134 and therefore output shaft 19 are driven in reverse at a speed determined by the speed of the sun gear member 132 and the ring gear/sun gear tooth ratio of the planetary gearset 130. The overall numerical value of the reverse ratio is determined by the planetary gearset 130. The torque-transmitting mechanism 158, as is seen in the truth table, can remain engaged through the neutral condition thereby simplifying the forward and reverse shift request.

The first forward speed ratio is established with the engagement of the torque-transmitting mechanisms 152 and 158. During the first forward speed ratio, the ring gear member 134 and sun gear member 142 are driven in reverse at a speed determined by the speed of sun gear member 132 and the ring gear/sun gear tooth ratio of the planetary gearset 130. The ring gear member 144 and therefore output shaft 19 are driven forwardly at a reduced ratio determined by the speed of the sun gear member 142 and the ring gear/sun gear tooth ratio of the planetary gearset 140. The overall numerical value of the first forward speed ratio is determined by the tooth ratios of the planetary gearsets 130 and 140.

The second forward speed ratio is established with the engagement of the torque-transmitting mechanisms 152 and 154. During the second forward speed ratio, the planet carrier assembly member 136 is driven forwardly at a speed determined by the speed of the sun gear member 132, the ring gear member 134, and the ring gear/sun gear tooth ratio of the planetary gearset 130. The planet carrier assembly member 126 and therefore output shaft 19 are driven forwardly at a speed determined by the speed of the ring gear member 124 and the ring gear/sun gear tooth ratio of the planetary gearset 120. The overall numerical value of the second forward speed ratio is determined by the tooth ratios of the planetary gearsets 120 and 130.

The third forward speed ratio is established with the engagement of the torque-transmitting mechanisms 152 and 156. With this combination of engagements, the sun gear member 132, planet carrier assembly member 146 and planet carrier assembly member 126 are all driven at the speed of the input shaft 17. The ring gear member 124 and the planet carrier assembly member 136 are driven forwardly at a speed determined by the speed of the planet carrier assembly member 126 and the ring gear/sun gear tooth ratio of the planetary gearset 120. The ring gear member 134 and sun gear member 142 are driven forwardly at a speed determined by the speed of the planet carrier assembly member 136, the speed of the sun gear member 132 and the ring gear/sun gear tooth ratio of the planetary gearset 130. The ring gear 144 and therefore output shaft 19 are driven forwardly at a speed determined by the speed of the planet carrier assembly member 146, the speed of the sun gear member 142, and the ring gear/sun gear tooth ratio of the planetary gearset 140. The overall numerical value of the third forward speed ratio is determined by all the three planetary gearsets 120, 130 and 140.

The fourth forward speed ratio is established with the engagement of the torque-transmitting mechanisms 154 and 156. This combination of engagements effectively connect the input shaft 17 directly with the output shaft 19 such that the fourth forward speed ratio is a direct drive or 1:1 ratio.

The fifth forward speed ratio is established with the engagement of the torque-transmitting mechanisms 150 and 156. During the fifth forward speed ratio, the planet carrier assembly member 136 and ring gear member 124 are driven at a speed determined by the speed of the sun gear member 132, the speed of the ring gear member 134 and the ring gear/sun gear tooth ratio of the planetary gearset 130. The planet carrier assembly member 126, ring gear member 134 and sun gear member 142 are driven at a speed determined by the speed of the ring gear member 124 and the ring gear/sun gear tooth ratio of the planetary gearset 120. The ring gear member 144 and output shaft 19 are driven at an increased speed ratio determined by the speed of the sun gear member 142, the speed of planet carrier assembly member 146, and the ring gear/sun gear tooth ratio of the planetary gearset 140. The overall numerical value of the fifth forward speed ratio is determined by the tooth ratios of all three planetary gearsets 120, 130 and 140.

The sixth forward speed ratio is established with the engagement of the torque-transmitting mechanisms 156 and 158. During the sixth forward speed ratio, the ring gear member 134 and sun gear member 142 are driven in reverse at a speed determined by the speed of the sun gear member 132 and the ring gear/sun gear tooth ratio of the planetary gearset 130. The output shaft 19 and ring gear member 144 are driven forwardly at an increased speed ratio determined by the speed of the planet carrier assembly member 146, the speed of the sun gear member 142, and the ring gear/sun gear tooth ratio of the planetary gearset 140. The overall numerical value of the sixth forward speed ratio is determined by the tooth ratios of the planetary gearsets 130 and 140.

As set forth above, the truth table of FIG. 4 describes the engagement sequence of the torque-transmitting mechanisms utilized to provide a reverse drive ratio and six forward speed ratios. It can be readily determined from the truth table that all of the single step forward interchanges are of the single transition type as are all of the double step forward interchanges. The truth table also provides an example of the ratios that can be attained with the family members shown in FIG. 3 utilizing the sample tooth ratios given in FIG. 4. The R1/S1 value is the tooth ratio of the planetary gearset 120; the R2/S2 value is the tooth ratio of the planetary gearset 130; and the R3/S3 value is the tooth ratio of the planetary gearset 140. Also, given in FIG. 4, are the ratio steps between single step ratios in the forward direction as well as the reverse to first ratio step. For example, the first to second step ratio is 1.62.

Figures 5, 6:
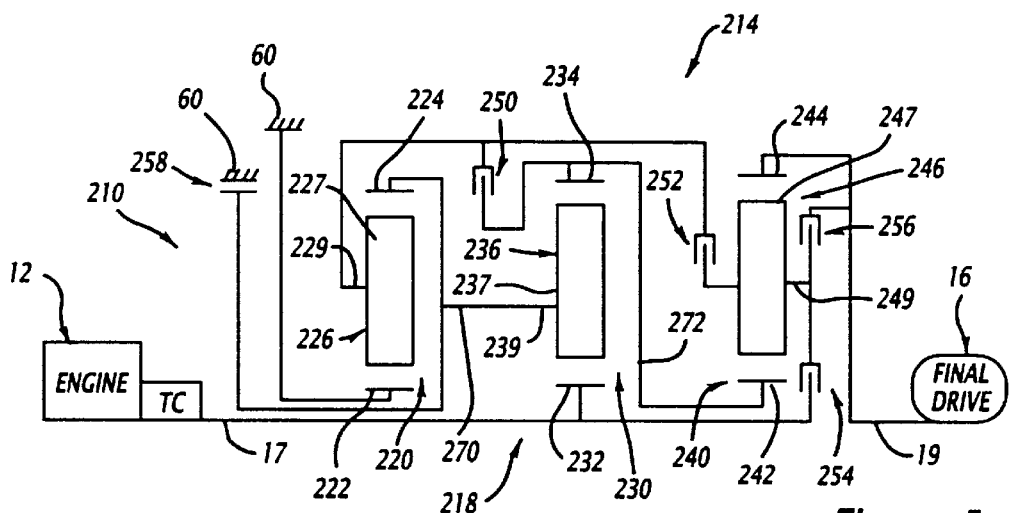
FIG. 5 is a schematic representation of a powertrain having a planetary transmission incorporating another family member of the present invention.
FIG. 6 is a truth table and chart depicting some of the operating characteristics of the powertrain shown in FIG. 5.

A powertrain 210, shown in FIG. 5, includes the engine and torque converter 12, a planetary transmission 214, and a final drive mechanism 16. The planetary transmission 214 includes an input shaft 17 continuously connected with the engine and torque converter 12, a planetary gear arrangement 218, and an output shaft 19 continuously connected with the final drive mechanism 16. The planetary gear arrangement 218 includes three planetary gearsets 220, 230 and 240.

The planetary gearset 220 includes a sun gear member 222, a ring gear member 224 and a planet carrier assembly member 226. The planet carrier assembly member 226 includes a plurality of pinion gears 227 rotatably mounted on a carrier member 229 and disposed in meshing relationship with both the sun gear member 222 and the ring gear member 224.

The planetary gearset 230 includes a sun gear member 232, a ring gear member 234 and a planet carrier assembly member 236. The planet carrier assembly member 236 includes a plurality of pinion gears 237 rotatably mounted on a carrier member 239 and disposed in meshing relationship with both the sun gear member 232 and the ring gear member 234.

The planetary gearset 240 includes a sun gear member 242, a ring gear member 244 and a planet carrier assembly member 246. The planet carrier assembly member 246 includes a plurality of pinion gears 247 rotatably disposed on a carrier member 249 and meshing with both the sun gear member 242 and the ring gear member 244.

The planetary gear arrangement 218 also includes five torque-transmitting mechanisms 250, 252, 254, 256 and 258. The torque-transmitting mechanisms 250, 252, 254, and 256 are of the rotating type torque-transmitting mechanisms, commonly termed clutches. The torque-transmitting mechanism 258 is a stationary type torque-transmitting mechanism, commonly termed a brake or reaction clutch.

The input shaft 17 is continuously connected with the sun gear member 232, the output shaft 19 is continuously connected with the ring gear member 244, and the sun gear member 222 is continuously connected with the transmission housing 60. The ring gear member 224 and the planet carrier assembly member 236 are continuously interconnected by an interconnecting member 270 which is selectively connectible with the transmission housing 60 through the torque-transmitting mechanism 258. The sun gear member 242 and ring gear member 234 are continuously interconnected by an interconnecting member 272 that is selectively connectible with the planet carrier assembly member 226 through the torque-transmitting mechanism 250. The planet carrier assembly member 246 is selectively connectible with the planet carrier assembly member 226 through the torque-transmitting mechanism 252, with the input shaft 17 through the torque-transmitting mechanism 254, and with the output shaft 19 through the torque-transmitting mechanism 256.

As shown in the truth table of FIG. 6, the torque-transmitting mechanisms are engaged in combinations of two to establish six forward speed ratios and one reverse ratio. It should also be noted that the torque-transmitting mechanism 258 can be engaged through the neutral condition, thereby simplifying the forward/reverse interchange.

To establish the reverse speed ratio, the torque-transmitting mechanisms 256 and 258 are engaged. With this combination of engagements, the planetary gearset 220 and planet carrier assembly member 236 are held stationary, and the planetary gearset 240 is conditioned for unitary rotation. The ring gear member 234 and therefore output shaft 19 rotate in reverse at a speed determined by the speed of the sun gear member 232 and the ring gear/sun gear tooth ratio of the planetary gearset 230. The overall numerical value of the reverse speed ratio is determined by the ring gear/sun gear tooth ratio of the planetary gearset 230.

To establish the first forward speed ratio, the torque-transmitting mechanisms 252 and 258 are engaged. With this combination of engagements, the planetary gearset 220, planet carrier assembly member 236, and planet carrier assembly member 246 are held stationary. The ring gear member 234 and sun gear member 242 are driven in reverse at a speed determined by the speed of the sun gear member 232 and the ring gear/sun gear tooth ratio of the planetary gearset 230. The ring gear member 244 and therefore output shaft 19 are driven forwardly at a speed determined by the speed of the sun gear member 242 and the ring gear/sun gear tooth ratio of the planetary gearset 240. The overall numerical value of the first forward speed ratio is determined by the tooth ratios of the planetary gearsets 230 and 240.

The second forward speed ratio is established with the engagement of the torque-transmitting mechanisms 252 and 256. With this combination of engagements, the planet carrier assembly member 226 rotates in unison with the output shaft 19. The planet carrier assembly member 236 and ring gear member 224 are driven forwardly at a speed determined by the speed of the sun gear member 232, the speed of the ring gear member 234, and the ring gear/sun gear tooth ratio of the planetary gearset 230. The planet carrier assembly member 226 and the output shaft 19 are driven forwardly at a speed determined by the speed of the ring gear member 224 and the ring gear/sun gear tooth ratio of the planetary gearset 220. The overall numerical value of the second forward speed ratio is determined by the tooth ratios of the planetary gearsets 220 and 230.

The third forward speed ratio is established with the engagement of the torque-transmitting mechanisms 252 and 254. With this combination of engagements, the planet carrier assembly member 226 is driven in unison with the input shaft 17. During the third forward speed ratio, the ring gear member 224 and planet carrier assembly member 236 are driven forwardly at a speed determined by the speed of the planet carrier assembly member 226 and the ring gear/sun gear tooth ratio of the planetary gearset 220. The ring gear member 234 and sun gear member 242 are driven at a speed determined by the speed of the sun gear member 232, the speed of the planet carrier assembly member 236, and the ring gear/sun gear tooth ratio of the planetary gearset 230. The output shaft 19 and ring gear member 244 are driven forwardly at a speed determined by the speed of the sun gear member 242, the speed of the planet carrier assembly member 246, and the ring gear/sun gear tooth ratio of the planetary gearset 240. The overall numerical value of the third forward speed ratio is determined by the tooth ratios of the planetary gearsets 220, 230 and 240.

The fourth forward speed ratio is established with the engagement torque-transmitting mechanisms 254 and 256. With this combination of engagements, the input shaft 17 and the output shaft 19 rotate in unison and therefore the fourth forward speed ratio is a direct drive or a 1:1 ratio.

The fifth forward speed ratio is established with the engagement of the torque-transmitting mechanisms 250 and 254. During the fifth forward speed ratio, the planet carrier assembly member 236 and ring gear member 224 are driven forwardly at a speed determined by the speed of the sun gear member 232, the speed of the ring gear member 234, and the ring gear/sun gear tooth ratio of the planetary gearset 230. The planet carrier assembly member 226, ring gear member 234, and sun gear member 242 are driven forwardly at a speed determined by the speed of the ring gear member 224 and the ring gear/sun gear tooth ratio of the planetary gearset 220. The ring gear member 244 and output shaft 19 are driven forwardly at a speed determined by the speed of the planet carrier assembly member 246, the speed of the sun gear member 242, and the ring gear/sun gear tooth ratio of the planetary gearset 240. The overall numerical value of the fifth forward speed ratio is determined by the tooth ratios of all three planetary gearsets 220, 230 and 240.

The sixth forward speed ratio is established with the engagement of the torque-transmitting mechanisms 254 and 258. During the sixth forward speed ratio, the ring gear member 234 and sun gear member 242 are driven in reverse at a speed determined by the speed of the sun gear member 232 and the ring gear/sun gear tooth ratio of the planetary gearset 230. The ring gear member 244 and therefore output shaft 19 are driven forwardly at an increased speed determined by the speed of the planet carrier assembly member 246, the speed of the sun gear member 242, and the ring gear/sun gear tooth ratio of the planetary gearset 240. The overall numerical value of the sixth forward speed ratio is determined by the tooth ratios of the planetary gearsets 230 and 240.

As previously set forth, the truth table of FIG. 6 describes the combinations of engagements utilized for the sixth forward speed ratios and reverse ratio. The truth table also provides an example of speed ratios that are available with family member described above. These examples of speed ratios are determined utilizing the tooth ratios given in FIG. 6. The R1/S1 value is the tooth ratio of the planetary gearset 220; the R2/S2 value is the tooth ratio of the planetary gearset 230; and the R3/S3 value is the tooth ratio of the planetary gearset 240. Also depicted in FIG. 6 is a chart representing the ratio steps between adjacent forward speed ratios and the first speed ratio. For example, the first to second ratio interchange has a step of 1.62. It can also be readily determined from the truth table of FIG. 6 that all of the single step forward ratio interchanges are of the single transition variety as are all of the double step forward interchanges.

Figures 7, 8:
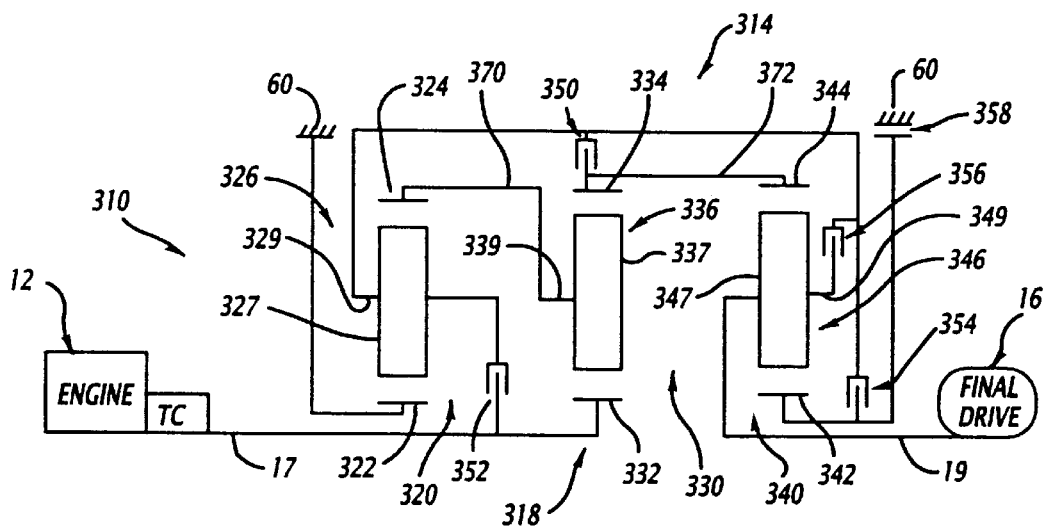
FIG. 7 is a schematic representation of a powertrain having a planetary transmission incorporating another family member of the present invention.
FIG. 8 is a truth table and chart depicting some of the operating characteristics of the powertrain shown in FIG. 7.

A powertrain 310, shown in FIG. 7, includes the engine and torque converter 12, a planetary transmission 314, and the final drive mechanism 16. The planetary transmission 314 includes an input shaft 17 continuously connected with the engine and torque converter 12, a planetary gear arrangement 318, and output shaft 19 continuously connected with the final drive mechanism 16. The planetary gear arrangement 318 includes three planetary gearsets 320, 330 and 340.

The planetary gearset 320 includes a sun gear member 322, a ring gear member 324 and a planet carrier assembly member 326. The planet carrier assembly member 326 includes a plurality of pinion gears 327 rotatably mounted on a carrier member 329 and disposed in meshing relationship with both the sun gear member 322 and the ring gear member 324.

The planetary gearset 330 includes a sun gear member 332, a ring gear member 334 and a planet carrier assembly member 336. The planet carrier assembly member 336 includes a plurality of pinion gears 337 rotatably mounted on a carrier member 339 and disposed in meshing relationship with both the sun gear member 332 and the ring gear member 334.

The planetary gearset 340 includes a sun gear member 342, a ring gear member 344 and a planet carrier assembly member 346. The planet carrier assembly member 346 includes a plurality of pinion gears 347 rotatably disposed on a carrier member 349 and meshing with both the sun gear member 342 and the ring gear member 344.

The planetary gear arrangement 318 also includes five torque-transmitting mechanisms 350, 352, 354, 356 and 358. The torque-transmitting mechanisms 350, 352, 354, and 356 are of the rotating type torque-transmitting mechanisms, commonly termed clutches. The torque-transmitting mechanism 358 is a stationary type torque-transmitting mechanism, commonly termed a brake or reaction clutch.

The input shaft 17 is continuously connected with the sun gear member 332, the output shaft 19 is continuously connected with the planet carrier assembly member 346, and the sun gear member 322 is continuously connected with the transmission housing 60. The ring gear member 324 and planet carrier assembly member 336 are continuously interconnected by an interconnecting member 370. The ring gear members 334 and 344 are continuously interconnected by an interconnecting member 372. The input shaft 17 is selectively connectible with the planet carrier assembly member 326 through the torque-transmitting mechanism 352. The planet carrier assembly member 326 is selectively connectible with the interconnecting member 372 through the torque-transmitting mechanism 350, selectively connectible with the planet carrier assembly member 346 through the torque-transmitting mechanism 356, and selectively connectible with the sun gear member 342 through the torque-transmitting mechanism 354. The sun gear member 342 is also selectively connectible with the transmission housing 60 through the torque-transmitting mechanism 358.

The truth table given in FIG. 8 shows the engagement sequence for the torque-transmitting mechanisms to provide the six forward speed ratios and one reverse ratio. It also shows that the torque-transmitting mechanism 358 can be engaged through the neutral condition to simplify the forward/reverse interchange.

During the reverse speed ratio, the torque-transmitting mechanisms 354 and 358 are engaged. This combination of engagements holds the planetary gearset 320, the sun gear member 342, and the planet carrier assembly member 336 stationary. The ring gear member 334 and ring gear member 344 are rotated in reverse at a speed determined by the speed of the sun gear member 332 and the ring gear/sun gear tooth ratio of the planetary gearset 330. The planet carrier assembly member 346 and output shaft 19 are rotated in reverse at a speed determined by the speed of the sun gear member 344 and the ring gear/sun gear tooth ratio of the planetary gearset 340. The overall numerical value of the reverse speed ratio is determined by the tooth ratios of the planetary gearsets 330 and 340.

The first forward speed ratio is established with the engagement of the torque-transmitting mechanisms 358 and 350. In the first forward speed ratio, the planet carrier assembly member 336 and ring gear member 324 are driven forwardly at a speed determined by the speed of the sun gear member 332, the speed of the ring gear member 334, and the ring gear/sun gear tooth ratio of the planetary gearset 330. The planet carrier assembly member 326, ring gear member 334 and ring gear 344 are driven forwardly at a speed determined the speed of the ring gear member 324 and the ring gear/sun gear tooth ratio of the planetary gearset 320. The planet carrier assembly member 346 and output shaft 19 are driven forwardly at a speed determined by the speed of the ring gear member 344 and the ring gear/sun gear tooth ratio of the planetary gearset 340. The overall numerical value of the first forward speed ratio is determined by the tooth ratios of the planetary gearsets 320, 330 and 340.

The second forward speed ratio is established with the engagement of the torque-transmitting mechanisms 350 and 356. During the second forward speed ratio, the planet carrier assembly member 336 and ring gear member 324 are driven forwardly at a speed determined by the speed of the sun gear member 332, the speed of the ring gear member 334, and the ring gear/sun gear tooth ratio of the planetary gearset 330. The planet carrier assembly member 326, ring gear member 344, and output shaft 19 are driven forwardly at a speed determined by the speed of the ring gear member 324 and the ring gear/sun gear tooth ratio of the planetary gearset 320. The overall numerical value of the second forward speed ratio is determined by the tooth ratios of the planetary gearsets 320 and 330.

The third forward speed ratio is established with the engagement of the torque-transmitting mechanisms 356 and 358. During the third forward speed ratio, the planet carrier assembly member 336 and ring gear member 324 are driven forwardly at a speed determined by the speed of the sun gear member 332, the speed of the ring gear member 334 (rotating reaction), and the ring gear/sun gear tooth ratio of the planetary gearset 330. The speed of the ring gear member 334 is determined by the speed of the planet carrier assembly member 346 and the ring gear/sun gear tooth ratio of the planetary gearset 340. The speed of the planet carrier assembly member 326, planet carrier assembly member 346, and output shaft 19 is determined by the speed of the ring gear member 324 and the ring gear/sun gear tooth ratio of the planetary gearset 320. The overall numerical value of the third forward speed ratio is determined by the tooth ratios of all three planetary gearsets 320, 330 and 340.

The fourth forward speed ratio is established with the engagement of the torque-transmitting mechanisms 352 and 356. This combination of engagements effectively connect the input shaft directly with the output shaft resulting in a direct drive or 1:1 ratio.

The fifth forward speed ratio is established with the engagement of the torque-transmitting mechanisms 352 and 358. During the fifth forward speed ratio, the ring gear member 324 and planet carrier assembly member 336 are driven forwardly at a speed determined by the speed of the planet carrier assembly member 326 and the ring gear/sun gear tooth ratio of the planetary gearset 320. The ring gear members 334 and 344 are driven forwardly at a speed determined by the speed of the sun gear member 332, the speed of the planet carrier assembly member 336, and the ring gear/sun gear tooth ratio of the planetary gearset 330. The planet carrier assembly member 346 and output shaft 19 are driven forwardly at an increased speed determined by the speed of the ring gear member 344 and the ring gear/sun gear tooth ratio of the planetary gearset 340. The overall numerical value of the fifth forward speed ratio is determined by the tooth ratios of three planetary gearsets 320, 330 and 340.

The sixth forward speed ratio is established with the engagement of the torque-transmitting mechanisms 352 and 354. During the sixth forward speed ratio, the ring gear member 324 and planet carrier assembly member 336 are driven forwardly at a speed determined by the speed of the planet carrier assembly 326 and the ring gear/sun gear tooth ratio of the planetary gearset 320. The ring gear members 334 and 344 are driven forwardly at a speed determined by the speed of the sun gear member 332, the speed of the planet carrier assembly member 336 and the ring gear/sun gear tooth ratio of the planetary gearset 330. The planet carrier assembly member 346 and output shaft 19 are driven forwardly at an increased speed determined by the speed of the ring gear member 344, the speed of the sun gear member 342, and ring gear/sun gear tooth ratio of the planetary gearset 340. The overall numerical value of the sixth forward speed ratio is determined by the tooth ratios of all three planetary gearsets 320, 330 and 340.

As previously set forth, the truth table of FIG. 8 describes the engagement sequence for the speed ratios of the planetary transmission 314. The truth table also provides an example of the numerical values that might be attained utilizing the tooth ratios given in FIG. 8. The R1/S1 value is the tooth ratio of the planetary gearset 320; the R2/S2 value is the tooth ratio of the planetary gearset 330; and the R3/S3 value is the tooth ratio of the planetary gearset 340. With the numerical ratios given, the ratio steps provided in the chart of FIG. 8 are available. For example, the ratio step between the first and second forward speeds is 1.5. It can also be determined from the truth table of FIG. 8 that at the single step forward interchanges are all single transition ratio changes. It is also evident from the truth table of FIG. 8 that the double step forward ratio interchanges are of the single transition variety.

Figures 9, 10:
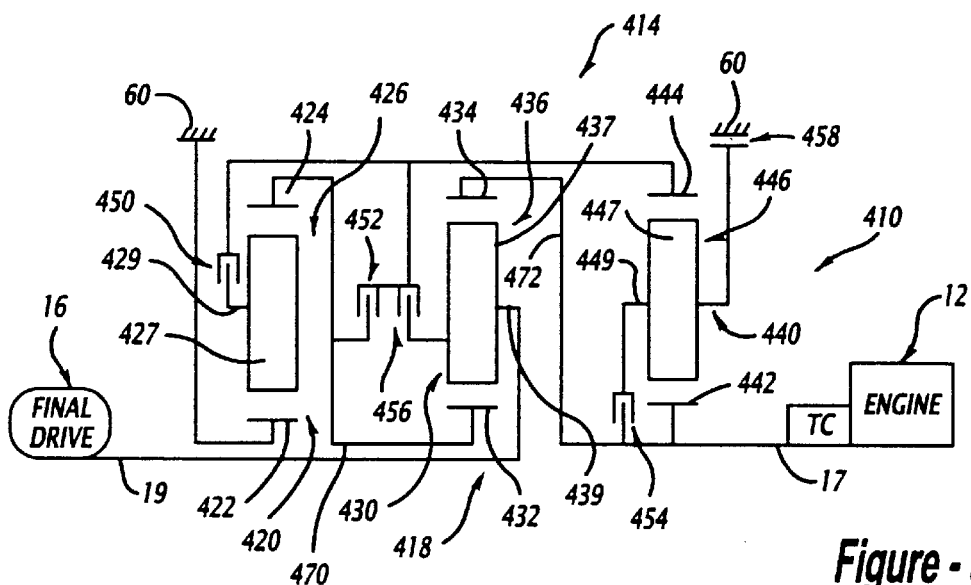
FIG. 9 is a schematic representation of a powertrain having a planetary transmission incorporating another family member of the present invention.
FIG. 10 is a truth table and chart depicting some of the operating characteristics of the powertrain shown in FIG. 9.

A powertrain 410, shown in FIG. 9, includes the engine and torque converter 12, a planetary transmission 414 and the final drive mechanism 16. The planetary transmission 414 includes a planetary gear arrangement 418, input shaft 17 and output shaft 19. The planetary gear arrangement 418 includes three simple planetary gearsets 420, 430 and 440.

The planetary gearset 420 includes a sun gear member 422, a ring gear member 424 and a planet carrier assembly member 426. The planet carrier assembly member 426 includes a plurality of pinion gears 427 rotatably mounted on a carrier member 429 and disposed in meshing relationship with both the sun gear member 422 and the ring gear member 424.

The planetary gearset 430 includes a sun gear member 432, a ring gear member 434 and a planet carrier assembly member 436. The planet carrier assembly member 436 includes a plurality of pinion gears 437 rotatably mounted on a carrier member 439 and disposed in meshing relationship with both the sun gear member 432 and the ring gear member 434.

The planetary gearset 440 includes a sun gear member 442, a ring gear member 444 and a planet carrier assembly member 446. The planet carrier assembly member 446 includes a plurality of pinion gears 447 rotatably disposed on a carrier member 449 and meshing with both the sun gear member 442 and the ring gear member 444.

The planetary gear arrangement 418 also includes five torque-transmitting mechanisms 450, 452, 454, 456 and 458. The torque-transmitting mechanisms 450, 452, 454, and 456 are of the rotating type torque-transmitting mechanisms, commonly termed clutches. The torque-transmitting mechanism 458 is a stationary type torque-transmitting mechanism, commonly termed a brake or reaction clutch.

The input shaft 17 is continuously connected with the sun gear member 442 that is continuously connected with the ring gear member 434 through an interconnecting member 472. The output shaft 19 is continuously connected with the planet carrier assembly member 436. The sun gear member 432 and ring gear member 424 are continuously interconnected by an interconnecting member 470. The sun gear member 422 is continuously connected with the transmission housing 60. The planet carrier assembly member 446 is selectively connectible with the input shaft 17 through the torque-transmitting mechanism 454 and with the transmission housing 60 through the torque-transmitting mechanism 458. The output shaft 19 and planet carrier assembly member 436 are selectively connectible with the ring gear member 444 through the torque-transmitting mechanism 456. The ring gear member 444 is selectively connectible with the interconnecting member 470 through the torque-transmitting mechanism 452 and with the planet carrier assembly member 426 through the torque-transmitting mechanism 450.

The truth table shown in FIG. 10 describes the engagement combination and sequence of the torque-transmitting mechanisms 450, 452, 454, 456 and 458 that are employed to provide the reverse drive ratio and the six forward speed ratios. It should be noted that torque-transmitting mechanism 458 is engaged through the neutral condition to simplify the forward/reverse interchange.

The reverse speed ratio is established with the engagement of the torque-transmitting mechanisms 456 and 458. The engagement of the torque-transmitting mechanism 456 connects the ring gear member 454 directly with the output shaft 19. The ring gear member 454 and therefore output shaft 19 are rotated in reverse at a speed determined by the speed of the sun gear member 442 and the ring gear/sun gear tooth ratio of the planetary gearset 440. The numerical value of the reverse speed ratio is determined by the planetary gearset 440.

The first forward speed ratio is established with the engagement of the torque-transmitting mechanisms 450 and 458. During the first forward speed ratio, the ring gear member 444 and planet carrier assembly member 426 are driven at a speed determined by the speed of the sun gear member 442 and the ring gear/sun gear tooth ratio of the planetary gearset 440. The ring gear member 424 and sun gear member 432 are driven at a speed determined by the speed of the planet carrier 426 and the ring gear/sun gear tooth ratio of the planetary gearset 420. The planet carrier assembly member 436 and the output shaft 19 are driven forwardly at a reduced ratio determined by the speed of the sun gear member 432, the speed of the ring gear member 434, and the ring gear/sun gear tooth ratio of the planetary gearset 430. The overall numerical value of the first forward speed ratio is determined by the tooth ratios of the planetary gearsets 420, 430 and 440.

During the second forward speed ratio, the ring gear member 444 and sun gear member 432 are driven at a speed determined by the speed of the sun gear member 442 and the ring gear/sun gear tooth ratio of the planetary gearset 440. The planet carrier assembly member 436 and therefore the output shaft 19 are driven forwardly at a reduced speed determined by the speed of the sun gear member 432, the speed of the ring gear member 434, and the ring gear/sun gear tooth ratio of the planetary gearset 430. The overall numerical value of the second forward speed ratio is determined by the tooth ratios of the planetary gearsets 430 and 440.

The third forward speed ratio is established with the engagement of the torque-transmitting mechanisms 450 and 452. This combination of engagements will hold the planetary gearset 420 from rotation as well as the sun gear member 432. The planet carrier assembly member 436 and therefore the output shaft 19 are driven forwardly at a reduced speed determined by the speed of the ring gear member 434 and the ring gear/sun gear tooth ratio of the planetary gearset 430. The numerical value of the third forward speed ratio is determined by the ring gear/sun gear tooth ratio of the planetary gearset 430.

The fourth forward speed ratio is established with the engagement of the torque-transmitting mechanisms 452 and 454. This combination of engagements provides for a unitary rotation of both the planetary gearsets 440 and 430. Therefore the input shaft 17 and the output shaft 19 rotate in unison and the fourth forward speed ratio is a direct drive or a 1:1 ratio.

The fifth forward speed ratio is established with the engagement of the torque-transmitting mechanisms 450 and 454. With this combination of engagements, the planet carrier assembly member 426 is driven at the speed of the input shaft 17. The ring gear member 424 and sun gear member 432 are driven forwardly at an increased speed ratio determined by the speed of the planet carrier assembly member 426 and the ring gear/sun gear tooth ratio of the planetary gearset 420. The planet carrier assembly member 436 and output shaft 19 are driven forwardly at an increased speed ratio determined by the speed of the sun gear member 432, the speed of the ring gear member 434, and the ring gear/sun gear tooth ratio of the planetary gearset 430. The numerical value of the fifth forward speed ratio is determined by the tooth ratios of the planetary gearsets 420 and 430.

The sixth forward speed ratio is established with the engagement of the torque-transmitting mechanisms 450 and 456. The ring gear member 424 and sun gear member 432 are driven forwardly at an increased speed ratio determined by the speed of the planet carrier assembly member 426 and the planet carrier assembly member 436. The planet carrier assembly member 436 and output shaft 19 are driven forwardly at an increased speed ratio determined by the speed of the sun gear member 432, the ring gear member 434, and the ring gear/sun gear tooth ratio of the planetary gearset 430. The overall numerical value of the sixth forward speed ratio is determined by the tooth ratios of the planetary gearsets 420 and 430.

The truth table of FIG. 10 provides not only the engagement sequence as described above, but also an example of speed ratios that are possible with the planetary gear arrangement 418. The ratios given in FIG. 10 are established using the tooth ratios also given in FIG. 10. The R1/S1 value is the tooth ratio of the planetary gearset 420; the R2/S2 value is the tooth ratio of the planetary gearset 430; and the R3/S3 value is the tooth ratio of the planetary gearset 440. Also given in FIG. 10 is a chart describing the step ratios between the adjacent forward speed ratios and the ratio step between the reverse and first forward speed. For example, the step ratio between the first and second forward speeds is 1.48.

Figures 11, 12:
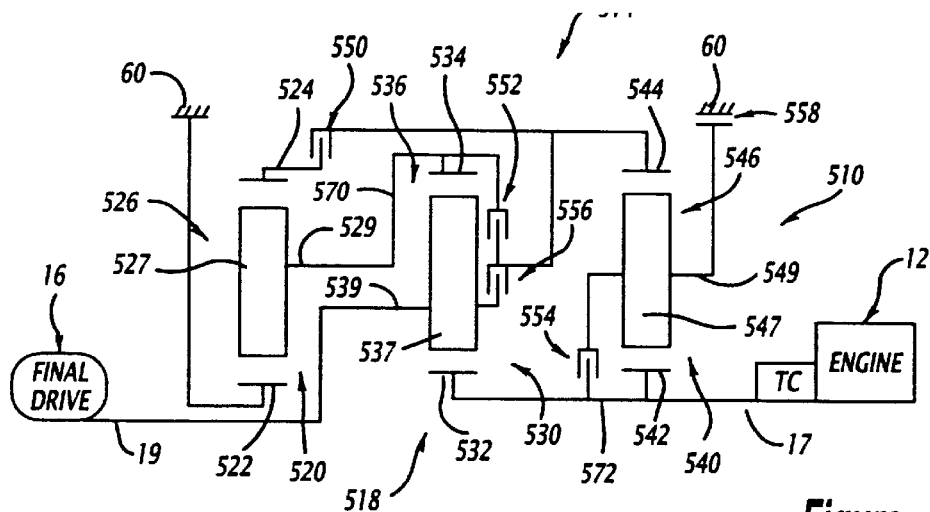
FIG. 11 is a schematic representation of a powertrain having a planetary transmission incorporating another family member of the present invention.
FIG. 12 is a truth table and chart depicting some of the operating characteristics of the powertrain shown in FIG. 11.

A powertrain 510, shown in FIG. 11, includes an engine and torque converter 12, a planetary gear transmission 514 and the final drive mechanism 16. The planetary transmission 514 includes the input shaft 17, a planetary gear arrangement 518 and the output shaft 19. The planetary gear arrangement 518 includes three planetary gearsets 520, 530 and 540.

The planetary gearset 520 includes a sun gear member 522, a ring gear member 524 and a planet carrier assembly member 526. The planet carrier assembly member 526 includes a plurality of pinion gears 527 rotatably mounted on a carrier member 529 and disposed in meshing relationship with both the sun gear member 522 and the ring gear member 524.

The planetary gearset 530 includes a sun gear member 532, a ring gear member 534 and a planet carrier assembly member 536. The planet carrier assembly member 536 includes a plurality of pinion gears 537 rotatably mounted on a carrier member 539 and disposed in meshing relationship with both the sun gear member 532 and the ring gear member 534.

The planetary gearset 540 includes a sun gear member 542, a ring gear member 544 and a planet carrier assembly member 546. The planet carrier assembly member 546 includes a plurality of pinion gears 547 rotatably disposed on a carrier member 549 and meshing with both the sun gear member 542 and the ring gear member 544.

The planetary gear arrangement 518 also includes five torque-transmitting mechanisms 550, 552, 554, 556 and 558. The torque transmitting mechanisms 550, 552, 554, and 556 are of the rotating type torque-transmitting mechanisms, commonly termed clutches. The torque-transmitting mechanism 558 is a stationary type torque-transmitting mechanism, commonly termed a brake or reaction clutch.

The input shaft 17 is continuously connected with the sun gear member 542 and sun gear member 532 that are continuously interconnected with an interconnecting member 572. The output shaft 19 is continuously connected with the planet carrier assembly member 536. The sun gear member 522 is continuously connected with the transmission housing 60. The planet carrier assembly member 526 and ring gear member 534 are continuously interconnected through an interconnecting member 570. The planet carrier assembly member 546 is selectively connectible with the input shaft 17 through the torque-transmitting mechanism 554 and with the housing 60 through the torque-transmitting mechanism 558. The ring gear member 544 is selectively connectible with the ring gear member 524 through the torque-transmitting mechanism 550, with the ring gear member 534 through the torque-transmitting mechanism 552, and with the planet carrier assembly member 536 and therefore the output shaft 19 through the torque-transmitting mechanism 556.

The truth table shown in FIG. 12 describes the engagement sequence in combination of the torque-transmitting mechanisms to provide the reverse speed ratio and six forward speed ratios. It should be noted that the torque-transmitting mechanism 558 can remain engaged through the neutral condition thereby simplifying the forward/reverse interchange. It can also be determined from the truth table in FIG. 12 that all of the single step forward ratio interchanges are of the single transition variety. Also, all of the double step forward interchanges are of the single transition variety. The chart of FIG. 12 describes the ratio steps between adjacent forward speed ratios and the ratio step between the reverse and first forward speed ratio.

Those skilled in the art, upon reviewing the truth table and the schematic representation of FIG. 11, can determine that the numerical value of the reverse speed ratio is determined by the ring gear/sun gear tooth ratio of the planetary gearset 540. The numerical value of the first forward speed ratio is determined by the tooth ratios of the planetary gearsets 530 and 540. The numerical value of the second forward speed ratio is determined by the tooth ratios of all three planetary gearsets 520, 530 and 540. The numerical value of the third forward speed ratio is determined by the ring gear/sun gear tooth ratio of the planetary gearset 530. The numerical of both the fourth and fifth forward speed ratios is determined by the tooth ratios of the planetary gearsets 520 and 530. The sixth forward speed ratio is a direct drive or 1:1 ratio.

The sample speed ratios given in the truth table are determined utilizing the tooth ratio members also given in FIG. 12. The R1/S1 value is the tooth ratio of the planetary gearset 520; the R2/S2 value is the tooth ratio of the planetary gearset 530; and the R3/S3 value is the tooth ratio of the planetary gearset 540.

Figures 13, 14:
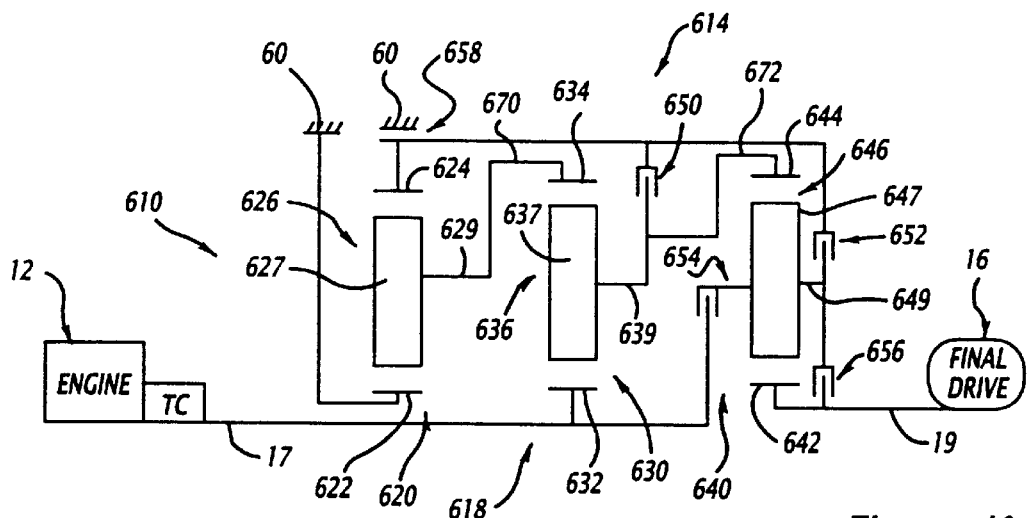
FIG. 13 is a schematic representation of a powertrain having a planetary transmission incorporating another family member of the present invention.
FIG. 14 is a truth table and chart depicting some of the operating characteristics of the powertrain shown in FIG. 13.

A powertrain 610, shown in FIG. 13, has the engine and torque converter 12, a planetary transmission 614 and the final drive mechanism 16. The planetary transmission 614 includes the input shaft 17, a planetary gear arrangement 618 and the output shaft 19. The planetary gear arrangement 618 includes three planetary gearsets 620, 630 and 640.

The planetary gearset 620 includes a sun gear member 622, a ring gear member 624 and a planet carrier assembly member 626. The planet carrier assembly member 626 includes a plurality of pinion gears 627 rotatably mounted on a carrier member 629 and disposed in meshing relationship with both the sun gear member 622 and the ring gear member 624.

The planetary gearset 630 includes a sun gear member 632, a ring gear member 634 and a planet carrier assembly member 636. The planet carrier assembly member 636 includes a plurality of pinion gears 637 rotatably mounted on a carrier member 639 and disposed in meshing relationship with both the sun gear member 632 and the ring gear member 634.

The planetary gearset 640 includes a sun gear member 642, a ring gear member 644 and a planet carrier assembly member 646. The planet carrier assembly member 646 includes a plurality of pinion gears 647 rotatably disposed on a carrier member 649 and meshing with both the sun gear member 642 and the ring gear member 644.

The planetary gear arrangement 618 also includes five torque-transmitting mechanisms 650, 652, 654, 656 and 658. The torque-transmitting mechanisms 650, 652, 654, and 656 are of the rotating type torque-transmitting mechanisms, commonly termed clutches. The torque-transmitting mechanism 658 is a stationary type torque-transmitting mechanism, commonly termed a brake or reaction clutch.

The input shaft 17 is continuously connected with the sun gear member 632. The output shaft 19 is continuously connected with the sun gear member 642. The sun gear member 622 is continuously connected with the transmission housing 60. The planet carrier assembly member 626 and ring gear member 634 are continuously interconnected through an interconnecting member 670. The planet carrier assembly member 636 and ring gear member 644 are continuously interconnected with an interconnecting member 672.

A planet carrier assembly member 646 is selectively connectible with the input shaft 17 through a torque-transmitting mechanism 654, with the output shaft 19 through a torque-transmitting mechanism 656, and with the ring gear member 624 through a torque-transmitting mechanism 652. The ring gear member 624 is selectively connectible with the interconnecting member 672 through a torque-transmitting mechanism 650 and is selectively connectible with the transmission housing 60 through a torque-transmitting mechanism 658.

The truth table shown in FIG. 14 describes the combination of torque-transmitting mechanism engagements that will provide the reverse drive ratio and the six forward speed ratios, as well as the sequence of these engagements and interchanges. The torque-transmitting mechanism 658 can remain engaged through the neutral condition thereby simplifying the forward/reverse interchange. It can be noted from the truth table that each of the single step forward interchanges are single transition ratio changes, and the double step forward interchanges are also single transition ratio changes.

The ratio values given are by way of example and are established utilizing the ring gear/sun gear tooth ratios given in FIG. 14. For example, the R1/S1 value is the tooth ratio of the planetary gearset 620; the R2/S2 value is the tooth ratio of the planetary gearset 630; and the R3/S3 value is the tooth ratio of the planetary gearset 640. The ratio steps between adjacent forward ratios and the reverse to first ratio are also given in FIG. 14.

Those skilled in the art will, upon reviewing the truth table of FIG. 14, recognize that the reverse ratio has a numerical value determined by the tooth ratios of planetary gearsets 630 and 640. The numerical value of the first forward speed ratio is determined by the ring gear/sun gear tooth ratio of planetary gearset 630. The numerical value of the second forward speed ratio is determined by the tooth ratios of the planetary gearsets 620 and 630. The numerical value of the third forward speed ratio is one. The numerical value of both the fourth and fifth speed ratios is determined utilizing the tooth ratios of the planetary gearsets 620, 630 and 640. The numerical value of the sixth forward speed ratio is determined utilizing the tooth ratios of the planetary gearsets 630 and 640.

Figures 15, 16:
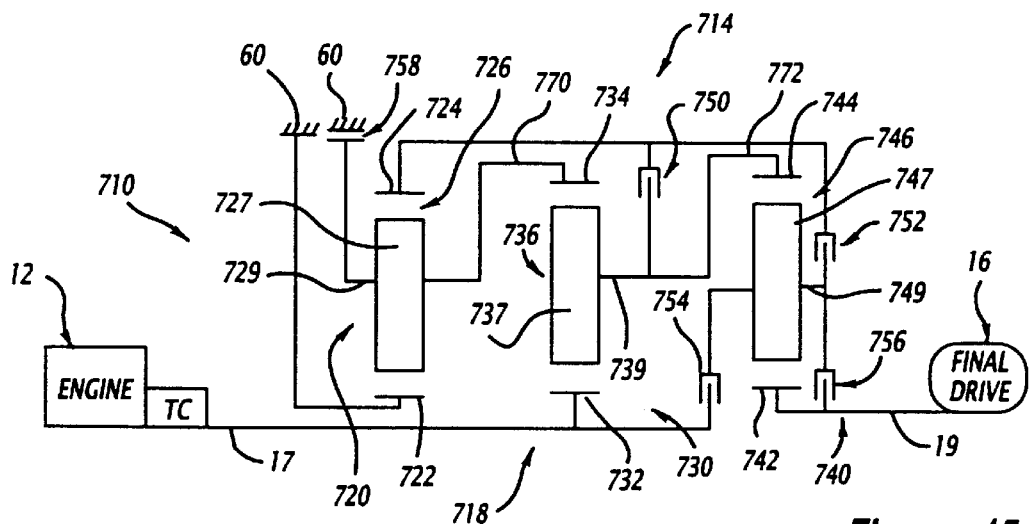
FIG. 15 is a schematic representation of a powertrain having a planetary transmission incorporating another family member of the present invention.
FIG. 16 is a truth table and chart depicting some of the operating characteristics of the powertrain shown in FIG. 15.

A powertrain 710, shown in FIG. 15, has the conventional engine and torque converter 12, a planetary transmission 714, and the conventional final drive mechanism 16. The engine and torque converter 12 are drivingly connected with the planetary transmission 714 through the input shaft 17. The planetary transmission 714 is drivingly connected with the final drive 16 through the output shaft 19. The planetary transmission 714 includes a planetary gear arrangement 718 that has a first planetary gearset 720, a second planetary gearset 730, and a third planetary gearset 740.

The planetary gear arrangement 718 also includes five torque-transmitting mechanisms 750, 752, 754, 756 and 758 which are conventional selectively engaged fluid-operated devices. The torque-transmitting mechanisms 750, 752, 754, and 756 are rotating type mechanisms that are commonly termed clutches. The torque-transmitting mechanism 758 is a stationary type mechanism, commonly termed a brake. The torque-transmitting mechanism 758 is connected with a stationary component of the transmission 714 such as the housing 60.

The planetary gearset 720 includes a sun gear member 722, a ring gear member 724 and a planet carrier assembly member 726. The planet carrier assembly member 726 includes a plurality of pinion gears 727 rotatably mounted on a carrier member 729 and disposed in meshing relationship with both the sun gear member 722 and the ring gear member 724.

The planetary gearset 730 includes a sun gear member 732, a ring gear member 734 and a planet carrier assembly member 736. The planet carrier assembly member 736 includes a plurality of pinion gears 737 rotatably mounted on a carrier member 739 and disposed in meshing relationship with both the sun gear member 732 and the ring gear member 734.

The planetary gearset 740 includes a sun gear member 742, a ring gear member 744 and a planet carrier assembly member 746. The planet carrier assembly member 746 includes a plurality of pinion gears 747 rotatably disposed on a carrier member 749 and meshing with both the sun gear member 742 and the ring gear member 744.

The input shaft 17 is continuously connected with the sun gear member 732. The output shaft 19 is continuously connected with the sun gear member 742. The sun gear member 722 is continuously connected with the transmission housing 60. The planet carrier assembly member 726 and ring gear member 734 are continuously interconnected by an interconnecting member 770 which is selectively connectible with the housing 60 through the torque-transmitting mechanism 758. The planet carrier assembly member 736 is continuously connected with the ring gear member 744 through an interconnecting member 772 that is also selectively connectible with the ring gear 724 through the torque-transmitting mechanism 750. The planet carrier assembly member 746 is selectively connectible with the input shaft 17 through the torque-transmitting mechanism 754, selectively connectible with the output shaft 19 through the torque-transmitting mechanism 756, and selectively connectible with the ring gear member 724 through the torque-transmitting mechanism 752.

The truth table of FIG. 16 defines the torque-transmitting mechanism engagement sequence utilized for each of the forward speed ratios and the reverse speed ratio. The truth table also indicates that the torque-transmitting mechanism 758 can remain engaged through the neutral condition thereby simplifying the forward/reverse interchange. Also given in the truth table is a set of numerical values that are attainable with the present invention utilizing the ring gear/sun gear tooth ratios also given in FIG. 16. The R1/S1 value is the tooth ratio of the planetary gearset 720; the R2/S2 value is the tooth ratio of the planetary gearset 730; and the R3/S3 value is the tooth ratio of the planetary gearset 740. As can also be determined from the truth table of FIG. 16, the single step forward interchanges are single transition shifts as are the double step interchanges in the forward direction.

FIG. 16 also provides a chart of the ratio steps between adjacent forward ratios and between the reverse and first forward ratio. For example, the ratio step between the first and second forward ratios is 1.74. Those skilled in the art will recognize that the numerical value of the reverse speed ratio is determined utilizing the tooth ratios of the planetary gearsets 730 and 740. The first forward speed ratio is determined utilizing the ring gear/sun gear tooth ratio of the planetary gearset 730. The value of the second forward speed ratio is determined utilizing the tooth ratios of the planetary gearsets 720 and 730. The third forward speed ratio is a 1:1 or direct drive ratio. The fourth and fifth speed ratios both have numerical values determined utilizing the tooth ratios of all three planetary gearsets 720, 730 and 740. The sixth forward speed ratio has a numerical value determined utilizing the tooth ratios of the planetary gearsets 730 and 740.

Figures 17, 18:
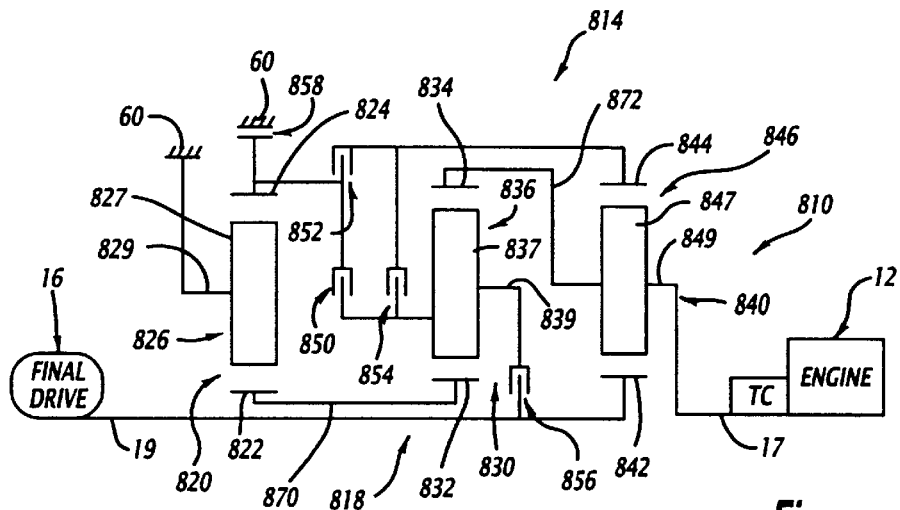
FIG. 17 is a schematic representation of a powertrain having a planetary transmission incorporating another family member of the present invention.
FIG. 18 is a truth table and chart depicting some of the operating characteristics of the powertrain shown in FIG. 17.

A powertrain 810, shown in FIG. 17, has the convention engine and torque converter 12, a planetary transmission 814, and the final drive mechanism 16. The engine and torque converter 12 are drivingly connected with the planetary transmission 814 through the input shaft 17. The planetary transmission 814 is drivingly connected with the final drive 16 through the output shaft 19. The planetary transmission 814 includes a planetary gear arrangement 818 that has a first planetary gearset 820, a second planetary gearset 830, and a third planetary gearset 840.

The planetary gear arrangement 818 also includes five torque-transmitting mechanisms 850, 852, 854, 856 and 858 that are conventional selectively engaged fluid-operated devices. The torque-transmitting mechanisms 850, 852, 854, and 856 are rotating type mechanisms that are commonly termed clutches. The torque-transmitting mechanism 858 is a stationary type mechanism, commonly termed a brake. The torque-transmitting mechanism 858 is connected with a stationary component of the transmission 814 such as the housing 60.

The planetary gearset 820 includes a sun gear member 822, a ring gear member 824 and a planet carrier assembly member 826. The planet carrier assembly member 826 includes a plurality of pinion gears 827 rotatably mounted on a carrier member 829 and disposed in meshing relationship with both the sun gear member 822 and the ring gear member 824.

The planetary gearset 830 includes a sun gear member 832, a ring gear member 834 and a planet carrier assembly member 836. The planet carrier assembly member 836 includes a plurality of pinion gears 837 rotatably mounted on a carrier member 839 and disposed in meshing relationship with both the sun gear member 832 and the ring gear member 834.

The planetary gearset 840 includes a sun gear member 842, a ring gear member 844 and a planet carrier assembly member 846. The planet carrier assembly member 846 includes a plurality of pinion gears 847 rotatably disposed on a carrier member 849 and meshing with both the sun gear member 842 and the ring gear member 844.

The input shaft 17 is continuously connected with the planet carrier assembly member 846 as well as the ring gear member 834 which is connected with the planet carrier assembly member 846 through an interconnecting member 872. The output shaft 19 is continuously connected with the sun gear member 842. The planet carrier assembly member 826 is continuously connected with the transmission housing 60. The sun gear members 822 and 832 are continuously interconnected by an interconnecting member 870. The planet carrier assembly member 836 is selectively connectible with the output shaft 19 through the torque-transmitting mechanism 856, selectively connectible with the ring gear member 844 through the torque-transmitting mechanism 854, and selectively connectible with the ring gear member 824 through the torque-transmitting mechanism 850. The ring gear member 824 is selectively connectible with the ring gear member 844 through the torque-transmitting mechanism 852.

The truth table shown in FIG. 18 defines the torque-transmitting mechanism engagement sequence that provides the reverse ratio and six forward speed ratios shown in the truth table and available with the planetary gear arrangement 818. The truth table indicates that the torque-transmitting mechanism 856 can remain engaged through the neutral condition thereby simplifying the forward/reverse interchange. A sample of numerical values for the individual ratios is also given in the truth table of FIG. 18. These numerical values have been calculated utilizing the ring gear/sun gear tooth ratios also given by way of example in FIG. 18. The R1/S1 value is the tooth ratio of the planetary gearset 820; the R2/S2 value is the tooth ratio of the planetary gearset 830; and the R3/S3 value is the tooth ratio of the planetary gearset 840. It can be readily recognized from the truth table that all of the single step forward interchanges are single transition ratio interchanges as well as all of the double step forward interchanges. FIG. 18 also describes the ratio steps between adjacent forward ratios and between the reverse and first forward ratio. For example, the ratio step between the first and second forward ratios is 1.66.

Those skilled in the art of planetary transmissions will recognize that the numerical value of the reverse speed ratio is determined by the tooth ratios of all three planetary gearsets 820, 830 and 840. The numerical value of the first forward speed ratio is determined by the tooth ratios of the planetary gearsets 820 and 830. The numerical value of the second forward speed ratio is determined by the ring gear/sun gear tooth ratio of the planetary gearset 830. The third forward speed ratio is a direct drive or 1:1 ratio. The numerical value of the fourth forward speed ratio is determined utilizing the tooth ratios of the planetary gearsets 830 and 840. The numerical value of the fifth forward speed ratio is determined utilizing the tooth ratios of all three planetary gearsets 820, 830 and 840. The numerical value of the sixth forward speed ratio is determined utilizing the ring gear/sun gear tooth ratio of the third planetary gearset 840.

Figures 19, 20:
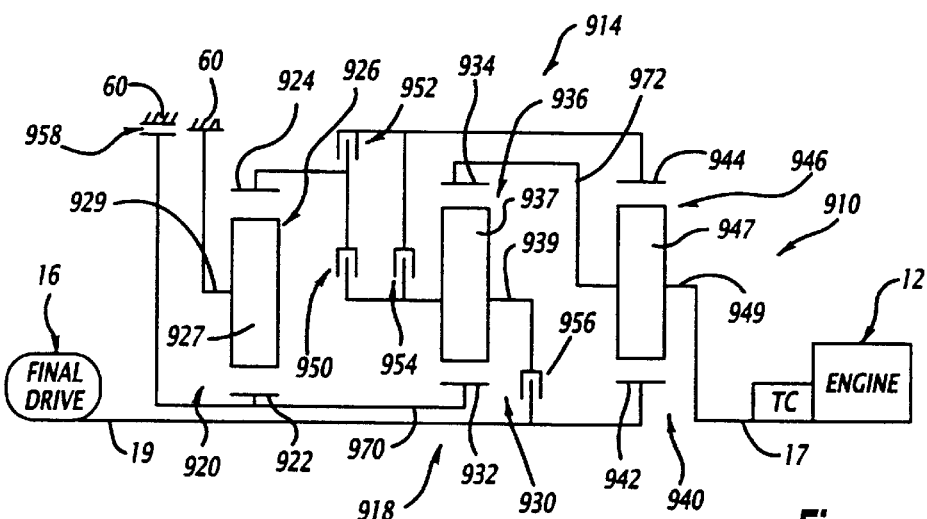
FIG. 19 is a schematic representation of a powertrain having a planetary transmission incorporating another family member of the present invention.
FIG. 20 is a truth table and chart depicting some of the operating characteristics of the powertrain shown in FIG. 19.

The powertrain 910, shown in FIG. 19, includes the conventional engine and torque converter 12, a planetary transmission 914, and the conventional final drive mechanism 16. The engine and torque converter 12 are drivingly connected with the planetary transmission 914 through the input shaft 17. The planetary transmission 914 is drivingly connected with the final drive 16 through the output shaft 19. The planetary transmission 914 includes a planetary gear arrangement 918 that has a first planetary gearset 920, a second planetary gearset 930, and a third planetary gearset 940.

The planetary gear arrangement 918 also includes five torque-transmitting mechanisms 950, 952, 954, 956 and 958 that are conventional selectively engaged fluid-operated devices. The torque-transmitting mechanisms 950, 952, 954, and 956 are rotating type mechanisms that are commonly termed clutches. The torque-transmitting mechanism 958 is a stationary type mechanism, commonly termed a brake. The torque-transmitting mechanism 958 is connected with a stationary component of the transmission 914 such as the housing 60.

The planetary gearset 920 includes a sun gear member 922, a ring gear member 924 and a planet carrier assembly member 926. The planet carrier assembly member 926 includes a plurality of pinion gears 927 rotatably mounted on a carrier member 929 and disposed in meshing relationship with both the sun gear member 922 and the ring gear member 924.

The planetary gearset 930 includes a sun gear member 932, a ring gear member 934 and a planet carrier assembly member 936. The planet carrier assembly member 936 includes a plurality of pinion gears 937 rotatably mounted on a carrier member 939 and disposed in meshing relationship with both the sun gear member 932 and the ring gear member 934.

The planetary gearset 940 includes a sun gear member 942, a ring gear member 944 and a planet carrier assembly member 946. The planet carrier assembly member 946 includes a plurality of pinion gears 947 rotatably disposed on a carrier member 949 and meshing with both the sun gear member 942 and the ring gear member 944.

The input shaft 17 is continuously connected with both the planet carrier assembly member 946 and the ring gear member 934. The ring gear member 934 and the planet carrier assembly member 946 are connected by an interconnecting member 972. The output shaft 19 is continuously connected with the sun gear member 942. The planet carrier assembly member 926 is continuously connected with the housing 60. The sun gear members 922 and 932 are continuously interconnected by an interconnecting member 970 and are also selectively connectible with the housing 60 through the torque-transmitting mechanism 958. The planet carrier assembly member 936 is selectively connectible with the output shaft 19 through the torque-transmitting mechanism 956, selectively connectible with the ring gear member 944 through torque-transmitting mechanism 954, and selectively connectible with the ring gear member 924 through the torque-transmitting mechanism 950. The ring gear member 924 is selectively connectible with the ring gear member 944 through the torque-transmitting mechanism 952.

The truth table of FIG. 20 describes the torque-transmitting mechanism engagement sequence utilized to provide the reverse speed ratio and six forward speed ratios. The truth table also indicates that the torque-transmitting mechanism 956 can remain engaged through the neutral condition which will simplify the forward/reverse ratio interchange. The truth table of FIG. 20 also provides a set of examples for the ratios for each of the reverse and forward speed ratios. These numerical values have been determined utilizing the ring gear/sun gear tooth ratios given in FIG. 20. The R1/S1 value is the tooth ratio of the planetary gearset 920; the R2/S2 value is the tooth ratio of the planetary gearset 930; and the R3/S3 value is the tooth ratio of the planetary gearset 940. It can also be determined from the truth table of FIG. 20 that each of the forward single step ratio interchanges are of the single transition variety. The double step forward ratio interchanges are also of the single transition interchanges.

Those skilled in the art, upon reviewing the engagement combinations, will recognize that the value of the reverse speed is determined utilizing all three planetary gearsets 920, 930 and 940. The numerical value of the first forward speed ratio is determined utilizing the tooth ratios of the planetary gearsets 920 and 930. The numerical value of the second forward speed ratio is determined by the ring gear/sun gear tooth ratio of the planetary gearset 930. The third forward speed ratio is a direct drive or 1:1 ratio. The numerical value of the fourth forward speed ratio is determined utilizing the tooth ratios of the planetary gearsets 930 and 940. The numerical value of the fifth forward speed ratio is determined utilizing the tooth ratios of all three planetary gearsets 920, 930 and 940. The numerical value of the sixth forward speed ratio is determined utilizing the ring gear/sun gear tooth ratio of the planetary gearset 940.

Figures 21, 22:
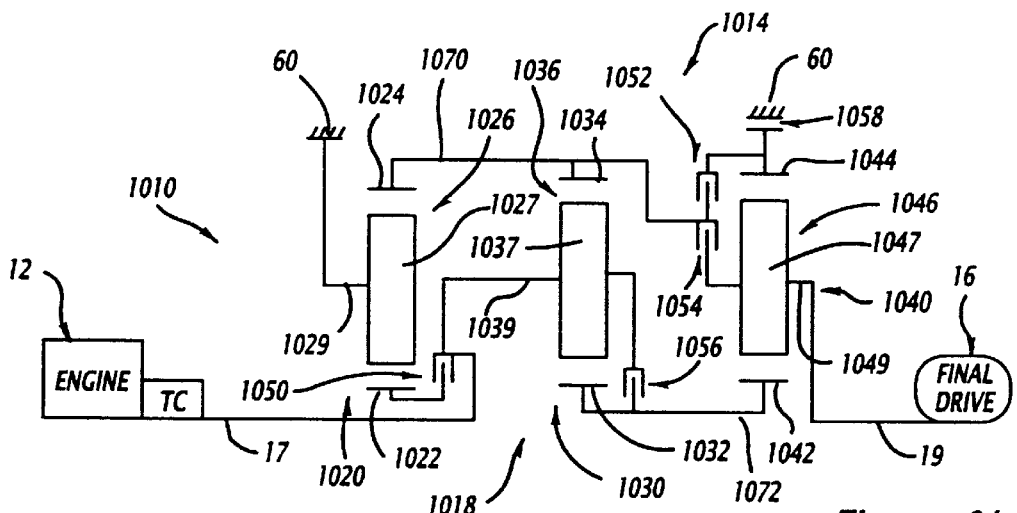
FIG. 21 is a schematic representation of a powertrain having a planetary transmission incorporating another family member of the present invention.
FIG. 22 is a truth table and chart depicting some of the operating characteristics of the powertrain shown in FIG. 21.

A powertrain 1010, shown in FIG. 21, includes the conventional engine and torque converter 12, a planetary transmission 1014, and the conventional final drive mechanism 16. The engine and torque converter 12 are drivingly connected with the planetary transmission 1014 through the input shaft 17. The planetary transmission 1014 is drivingly connected with the final drive 16 through the output shaft 19. The planetary transmission 1014 includes a planetary gear arrangement 1018 that has a first planetary gearset 1020, a second planetary gearset 1030, and a third planetary gearset 1040.

The planetary gear arrangement 1018 also includes five torque-transmitting mechanisms 1050, 1052, 1054, 1056 and 1058 that are conventional selectively engaged fluid-operated devices. The torque-transmitting mechanisms 1050, 1052, 1054, and 1056 are rotating type mechanisms that are commonly termed clutches. The torque-transmitting mechanism 1058 is a stationary type mechanism, commonly termed a brake. The torque-transmitting mechanism 1058 is connected with a stationary component of the transmission 1014 such as the housing 60.

The planetary gearset 1020 includes a sun gear member 1022, a ring gear member 1024 and a planet carrier assembly member 1026. The planet carrier assembly member 1026 includes a plurality of pinion gears 1027 rotatably mounted on a carrier member 1029 and disposed in meshing relationship with both the sun gear member 1022 and the ring gear member 1024.

The planetary gearset 1030 includes a sun gear member 1032, a ring gear member 1034 and a planet carrier assembly member 1036. The planet carrier assembly member 1036 includes a plurality of pinion gears 1037 rotatably mounted on a carrier member 1039 and disposed in meshing relationship with both the sun gear member 1032 and the ring gear member 1034.

The planetary gearset 1040 includes a sun gear member 1042, a ring gear member 1044 and a planet carrier assembly member 1046. The planet carrier assembly member 1046 includes a plurality of pinion gears 1047 rotatably disposed on a carrier member 1049 and meshing with both the sun gear member 1042 and the ring gear member 1044.

The input shaft 17 is continuously connected with the planet carrier assembly member 1036. The output shaft 19 is continuously connected with the planet carrier assembly member 1046. The planet carrier assembly member 1026 is continuously connected with the transmission housing 60. The ring gear member 1024 and ring gear member 1034 are continuously interconnected by an interconnecting member 1070. The sun gear members 1032 and 1042 are continuously interconnected by an interconnecting member 1072.

The input shaft 17 is selectively connectible with the sun gear member 1022 through the torque-transmitting mechanism 1050. The planet carrier assembly member 1036 is selectively connectible with the sun gear members 1032 and 1042 through the torque-transmitting mechanism 1056. The output shaft 19 of planet carrier assembly member 1046 is selectively connectible with the interconnecting member 1070 through the torque-transmitting mechanism 1054. The ring gear member 1044 is selectively connectible with the interconnecting member 1070 through the torque-transmitting mechanism 1052 and with the transmission housing 60 through the torque-transmitting mechanism 1058.

The truth table shown in FIG. 22 describes the engagement combinations and the engagement sequence necessary to provide the reverse drive ratio and the six forward speed ratios. A sample of the numerical values for the ratios is also provided in the truth table of FIG. 22. These values are determined utilizing the ring gear/sun gear tooth ratios also given in FIG. 22. The R1/S1 value is the tooth ratio for the planetary gearset 1020; the R2/S2 value is the tooth ratio for the planetary gearset 1030; and the R3/S3 value is the tooth ratio for the planetary gearset 1040. Also given in FIG. 22 is a chart describing the step ratios between the adjacent forward speed ratios and the reverse to first forward speed ratio. For example, the first to second forward speed ratio step is 1.86. It can be readily determined from the truth table of FIG. 22 that each of the forward single step ratio interchanges is a single transition shift. All of the double step interchanges, with the exception of first to third, are also single transition ratio interchanges.

Those skilled in the art, will recognize that the numerical value of the reverse speed ratio is determined utilizing the ring gear/sun gear tooth ratio of the planetary gearset 1020. The numerical value of the first forward speed ratio is determined utilizing the ring gear/sun gear tooth ratio of the planetary gearset 1040. The numerical value of the second forward speed ratio is determined utilizing the tooth ratios of the planetary gearsets 1030 and 1040. The third forward speed ratio is a 1:1 or direct drive. The numerical value of the fourth forward speed ratio is determined utilizing the tooth ratios of the planetary gearsets 1030 and 1040. Both the fifth and sixth forward speed ratios have numerical values determined utilizing the tooth ratios of all three planetary gearsets 1020, 1030 and 1040.

Figures 23, 24:
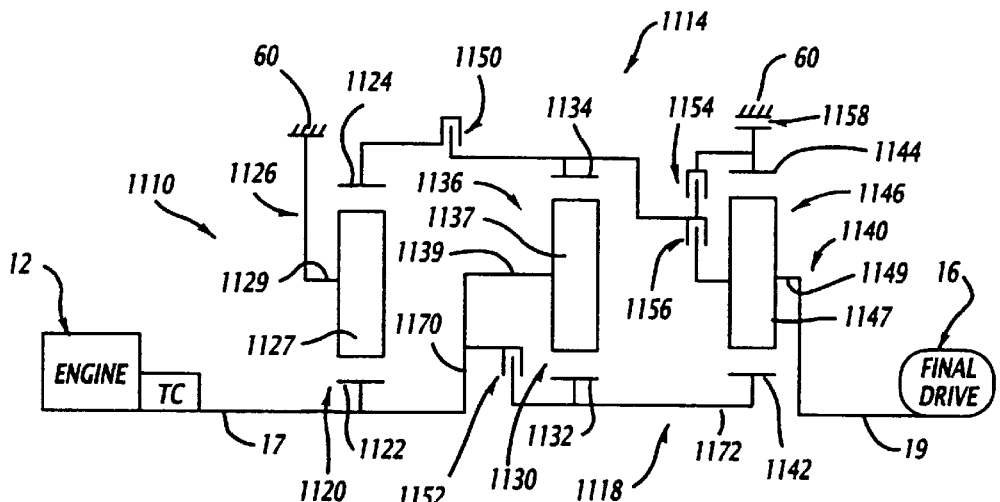
FIG. 23 is a schematic representation of a powertrain having a planetary transmission incorporating another family member of the present invention.
FIG. 24 is a truth table and chart depicting some of the operating characteristics of the powertrain shown in FIG. 23.

A powertrain 1110, shown in FIG. 23, has a conventional engine and torque converter 12, a planetary transmission 1114, and the conventional final drive mechanism 16. The planetary transmission 1114 includes a planetary gear arrangement 1118 which is connected with the engine and torque converter 12 through input shaft 17 and with the final drive mechanism 16 through the output shaft 19. The planetary gear arrangement 1118 includes three planetary gearsets 1120, 1130 and 1140.

The planetary gear arrangement 1118 also includes five torque-transmitting mechanisms 1150, 1152, 1154, 1156 and 1158 that are conventional selectively engaged fluid-operated devices. The torque-transmitting mechanisms 1150, 1152, 1154, and 1156 are rotating type mechanisms that are commonly termed clutches. The torque-transmitting mechanism 1158 is a stationary type mechanism, commonly termed a brake. The torque-transmitting mechanism 1158 is connected with a stationary component of the transmission 1114 such as the housing 60.

The planetary gearset 1120 includes a sun gear member 1122, a ring gear member 1124 and a planet carrier assembly member 1126. The planet carrier assembly member 1126 includes a plurality of pinion gears 1127 rotatably mounted on a carrier member 1129 and disposed in meshing relationship with both the sun gear member 1122 and the ring gear member 1124.

The planetary gearset 1130 includes a sun gear member 1132, a ring gear member 1134 and a planet carrier assembly member 1136. The planet carrier assembly member 1136 includes a plurality of pinion gears 1137 rotatably mounted on a carrier member 1139 and disposed in meshing relationship with both the sun gear member 1132 and the ring gear member 1134.

The planetary gearset 1140 includes a sun gear member 1142, a ring gear member 1144 and a planet carrier assembly member 1146. The planet carrier assembly member 1146 includes a plurality of pinion gears 1147 rotatably disposed on a carrier member 1149 and meshing with both the sun gear member 1142 and the ring gear member 1144.

The input shaft 17 is continuously connected with the sun gear member 1122 and the planet carrier assembly member 1136. The sun gear member 1122 and planet carrier assembly member 1136 are continuously interconnected with an interconnecting member 1170. The output shaft 19 is continuously connected with the planet carrier assembly member 1146 and selectively connectible with the ring gear member 1134 through the torque-transmitting mechanism 1156. The planet carrier assembly member 1126 is continuously connected with the transmission housing 60. The sun gear member 1132 and 1142 are continuously interconnected by an interconnecting member 1172 and selectively connectible with the input shaft 17 through the torque-transmitting mechanism 1152. The ring gear member 1134 is selectively connectible with the ring gear member 1124 through the torque-transmitting mechanism 1150 and selectively connectible with the ring gear member 1144 through the torque-transmitting mechanism 1154. The ring gear member 1144 is selectively connectible with the transmission housing 60 through the torque-transmitting mechanism 1158.

The truth table, shown in FIG. 24, describes the engagement sequence and engagement combinations utilized with the present family member to provide a reverse drive ratio and six forward speed ratios. The truth table of FIG. 24 provides an example of numerical ratios that are available with the present family member. These numerical values are established utilizing the example ring gear/sun gear tooth ratios also given in FIG. 24. The R1/S1 value is the tooth ratio of the planetary gearset 1120; the R2/S2 value is the tooth ratio of the planetary gearset 1130; and the R3/S3 value is the tooth ratio of the planetary gearset 1140. As can be determined from the truth table, all of the single ratio interchanges between adjacent forward speeds are of the single transition variety. The double step interchanges, with the exception of the first to third double step interchange, are single transition interchanges also. The chart of FIG. 24 provides an example of the ratio steps that are available between adjacent forward drive ratios and between the reverse ratio and the first forward speed ratio. For example, the ratio step between the first and second forward speed ratios is 1.85.

Those skilled in the art will recognize that the numerical value of the reverse speed ratio is determined by the ring gear/sun gear tooth ratio of the planetary gearset 1120. The numerical value of the first forward speed ratio is determined by the ring gear/sun gear tooth ratio of the planetary gearset 1140. The numerical value of the second forward speed ratio is determined by the tooth ratios of the planetary gearsets 1130 and 1140. The numerical value of the third forward speed ratio is a direct drive or 1:1 ratio. The numerical value of the fourth forward speed ratio is determined by the tooth ratios of the planetary gearsets 1130 and 1140. The numerical value of both the fifth and sixth forward speed ratios is determined by the tooth ratios of all three planetary gearsets 1120, 1130 and 1140.

Figures 25, 26:
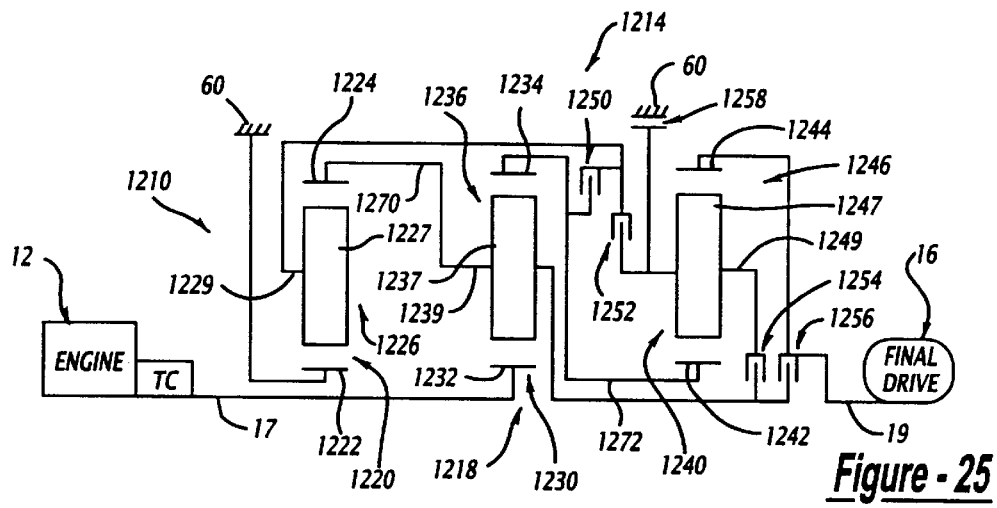
FIG. 25 is a schematic representation of a powertrain having a planetary transmission incorporating another family member of the present invention.
FIG. 26 is a truth table and chart depicting some of the operating characteristics of the powertrain shown in FIG. 25.

A powertrain 1210, shown in FIG. 25, includes a conventional engine and torque converter 12, a planetary transmission 1214, and the conventional final drive mechanism 16. The planetary transmission 1214 includes a planetary gear arrangement 1218 that is driven from the engine and torque converter 12 through input shaft 17, and the output shaft 19 thereof is connected with the final drive mechanism 16. The planetary gear arrangement 1218 includes three planetary gearsets 1220, 1230 and 1240 and five torque-transmitting mechanisms 1250, 1252, 1254, 1256 and 1258. The torque-transmitting mechanism 1258 is a stationary type torque-transmitting mechanism, commonly termed a brake. The remaining torque-transmitting mechanisms are of the rotating torque-transmitting type, commonly termed clutches.

The planetary gearset 1220 includes a sun gear member 1222, a ring gear member 1224 and a planet carrier assembly member 1226. The planet carrier assembly member 1226 includes a plurality of pinion gears 1227 rotatably mounted on a carrier member 1229 and disposed in meshing relationship with both the sun gear member 1222 and the ring gear member 1224.

The planetary gearset 1230 includes a sun gear member 1232, a ring gear member 1234 and a planet carrier assembly member 1236. The planet carrier assembly member 1236 includes a plurality of pinion gears 1237 rotatably mounted on a carrier member 1239 and disposed in meshing relationship with both the sun gear member 1232 and the ring gear member 1234.

The planetary gearset 1240 includes a sun gear member 1242, a ring gear member 1244 and a planet carrier assembly member 1246. The planet carrier assembly member 1246 includes a plurality of pinion gears 1247 rotatably disposed on a carrier member 1249 and meshing with both the sun gear member 1242 and the ring gear member 1244.

The sun gear member 1232 is continuously connected with the input shaft 17, the ring gear member 1244 is continuously connected with the output shaft 19, and the sun gear member 1222 is continuously connected with the transmission housing 60. The ring gear member 1224 and planet carrier assembly member 1236 are continuously interconnected by an interconnecting member 1270. The sun gear member 1242 and the ring gear member 1234 are continuously interconnected by an interconnecting member 1272. The output shaft 19 and ring gear member 1244 are selectively connectible with the planet carrier assembly member 1236 and therefore the interconnecting member 1270 through the torque-transmitting mechanism 1256. The planet carrier assembly member 1246 is selectively connectible with the planet carrier assembly member 1236 and the interconnecting member 1270 through the torque-transmitting mechanism 1254, selectively connectible with the planet carrier assembly member 1226 through the torque-transmitting mechanism 1252, and selectively connectible with the transmission housing 60 through the torque-transmitting mechanism 1258. The interconnecting member 1272 and therefore sun gear member 1242 and ring gear member 1234, are selectively connectible with the planet carrier assembly member 1226 through the torque-transmitting mechanism 1250.

The truth table shown in FIG. 26 defines the engagement sequence and interchange sequence utilized by the family member described in FIG. 25 to provide the reverse ratio and seven forward speed ratios. The truth table of FIG. 26 also provides a set of example numbers that can be established in the planetary gear arrangement 1218 utilizing ring gear/sun gear tooth ratios also given in FIG. 26. The R1/S1 value is the ring gear/sun gear tooth ratio of the planetary gearset 1220; the R2/S2 value is the ring gear/sun gear tooth ratio of the planetary gearset 1230; and the R3/S3 value is the ring gear/sun gear tooth ratio of the planetary gearset 1240.

The chart of FIG. 26 describes the ratio steps between adjacent forward speed ratios for both a six-speed transmission and for a seven-speed transmission. These step ratios are established utilizing the example speed ratios given in the truth table. It can also be readily determined from the truth table that each of the single step forward interchanges are single transition interchanges, as are each of the double step forward interchanges. Also in reviewing the truth table, it is seen that the torque-transmitting mechanism 1258 can remain engaged through the neutral condition thereby simplifying the forward/reverse interchange.

Those skilled in the art will recognize that the numerical value of the reverse speed ratio is determined utilizing the ring gear/sun gear tooth ratios of all three planetary gearsets 1220, 1230 and 1240. The numerical value of the first and second forward speed ratios are determined by the tooth ratios of the planetary gearsets 1230 and 1240. The numerical value of the third forward speed ratio is determined by the tooth ratios of the planetary gearsets 1220, 1230 and 1240. The numerical value of the fourth and fifth forward speed ratios are determined by the tooth ratios of the planetary gearsets 1220 and 1230. The numerical value of the sixth forward speed ratio is determined by the tooth ratios of the planetary gearsets 1220, 1230 and 1240. The seventh forward speed ratio is the 1:1 ratio or direct drive.

Figures 27, 28:
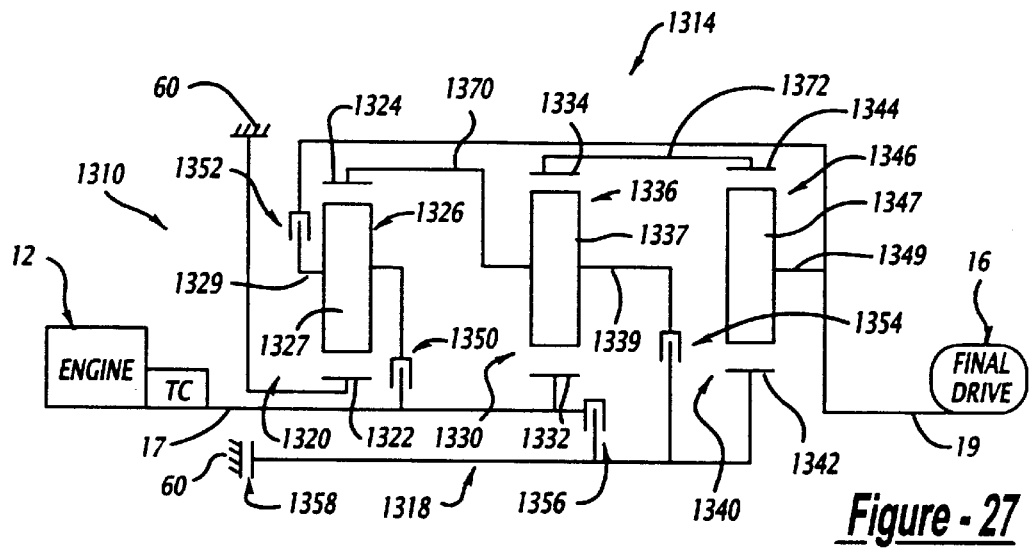
FIG. 27 is a schematic representation of a powertrain having a planetary transmission incorporating another family member of the present invention.
FIG. 28 is a truth table and chart depicting some of the operating characteristics of the powertrain shown in FIG. 27.

A powertrain 1310, shown in FIG. 27, includes the engine and torque converter 12, a planetary transmission 1314, and a final drive mechanism 16. The planetary transmission 1314 has a planetary gear arrangement 1318 which includes input shaft 17 connected with the engine and torque converter 12 and output shaft 19 connected with the final drive mechanism 16. The planetary gear arrangement 1318 also includes three planetary gearsets 1320, 1330 and 1340 and five torque-transmitting mechanisms 1350, 1352, 1354, 1356 and 1358. With the exception of the torque-transmitting mechanism 1358, the torque-transmitting mechanisms are of the rotating type, or clutches, and the torque-transmitting mechanism 1358 is of the stationary type, or brake.

The planetary gearset 1320 includes a sun gear member 1322, a ring gear member 1324 and a planet carrier assembly member 1326. The planet carrier assembly member 1326 includes a plurality of pinion gears 1327 rotatably mounted on a carrier member 1329 and disposed in meshing relationship with both the sun gear member 1322 and the ring gear member 1324.

The planetary gearset 1330 includes a sun gear member 1332, a ring gear member 1334 and a planet carrier assembly member 1336. The planet carrier assembly member 1336 includes a plurality of pinion gears 1337 rotatably mounted on a carrier member 1339 and disposed in meshing relationship with both the sun gear member 1332 and the ring gear member 1334.

The planetary gearset 1340 includes a sun gear member 1342, a ring gear member 1344 and a planet carrier assembly member 1346. The planet carrier assembly member 1346 includes a plurality of pinion gears 1347 rotatably disposed on a carrier member 1349 and meshing with both the sun gear member 1342 and the ring gear member 1344.

The input shaft 17 is continuously connected with the sun gear member 1332, the output shaft 19 is continuously connected with the planet carrier assembly member 1346, and the sun gear member 1322 is continuously connected the transmission housing 60. The ring gear member 1324 and planet carrier assembly member 1336 are continuously interconnected by an interconnecting member 1370 and selectively connectible with the sun gear member 1342 through the torque-transmitting mechanism 1354. The ring gear members 1334 and 1344 are continuously interconnected through an interconnecting member 1372. The sun gear member 1342 is selectively connectible with the input shaft 17 through the torque-transmitting mechanism 1356 and to the transmission housing 60 through the torque-transmitting mechanism 1358. The planet carrier assembly member 1326 is selectively connectible with the input shaft 17 through the torque-transmitting mechanism 1350 and with the output shaft 19 through the torque-transmitting mechanism 1352.

The truth table shown in FIG. 28 defines the sequence of interchanges required and the combinations of engagements required to provide the reverse speed ratio and seven forward speed ratios. As with the family members described above in FIG. 25, the family member defined in planetary gear arrangement 1318 also provides seven forward speed ratios. The truth table provides a numerical example of the ratios that can be attained utilizing the family member of FIG. 27. These numerical values are established utilizing the example ring gear/sun gear tooth ratios also given in FIG. 28. The R1/S1 value is the tooth ratio of the planetary gearset 1320; the R2/S2 value is the tooth ratio of the planetary gearset 1330; and the R3/S3 is the tooth ratio of the planetary gearset 1340. As is evident from the truth table of FIG. 28, all of the single step forward interchanges as well as the double step forward interchanges are of the single transition variety.

The chart given in FIG. 27 defines the numerical value of the ratio steps between adjacent forward speed ratios as well as the reverse to forward ratio interchange. The values have been established utilizing the tooth ratios provided by way of example in FIG. 28. The numerical value of the reverse speed ratio is determined by the tooth ratios of the planetary gearsets 1330 and 1340. All of the forward speed ratios, with the exception of the fourth forward speed ratio, are determined utilizing the six ratios of all three planetary gearsets 1320, 1330 and 1340. The fourth forward speed ratio is a 1:1 ratio or direct drive.

Figures 29, 30:
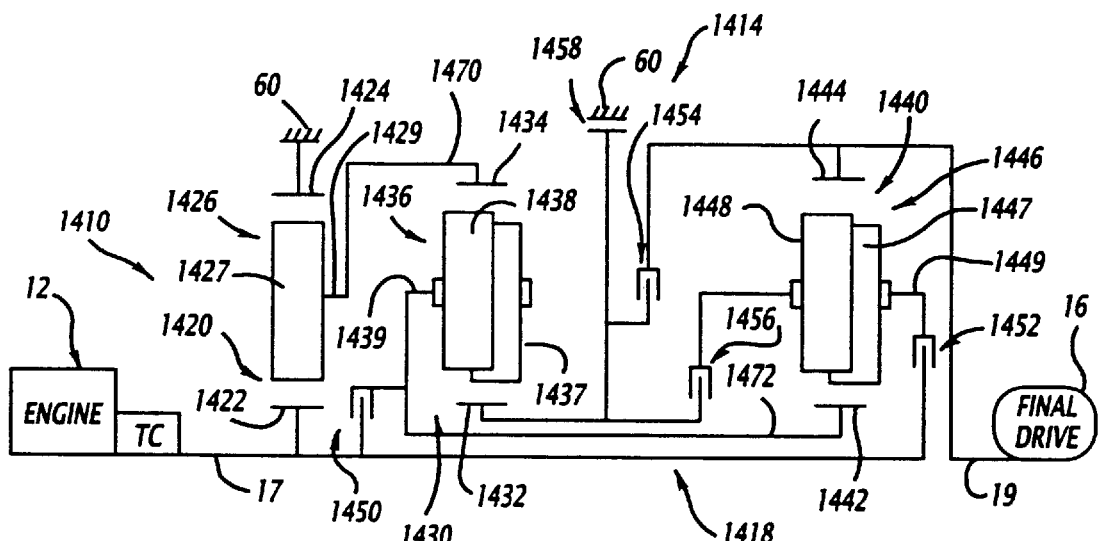
FIG. 29 is a schematic representation of a powertrain having a planetary transmission incorporating another family member of the present invention.
FIG. 30 is a truth table and chart depicting some of the operating characteristics of the powertrain shown in FIG. 29.

A powertrain 1410, shown in FIG. 29, includes the engine and torque converter 12, a planetary transmission 1414, and the final drive mechanism 16. The planetary transmission 1414 includes a planetary gear arrangement 1418 that is connected with the engine and torque converter 12 and input shaft 17, and with the final drive mechanism 16 through output shaft 19. The planetary gear arrangement 1418 includes three planetary gearsets 1420, 1430 and 1440 and five torque-transmitting mechanisms 1450, 1452, 1454, 1456 and 1458. The torque-transmitting mechanism 1458 is a stationary type torque-transmitting mechanism, commonly termed a brake, while the remaining torque-transmitting mechanisms are rotating type torque-transmitting mechanisms, commonly termed clutches.

The planetary gearset 1420 includes a sun gear member 1422, a ring gear member 1424, and a planet carrier assembly member 1426 having a planet carrier member 1429 on which is rotatably mounted a plurality of pinion gears 1427 that are disposed in meshing relationship with both the sun gear member 1422 and the ring gear member 1424.

The planetary gearset 1430 includes a sun gear member 1432, a ring gear member 1434, and a planet carrier assembly member 1436. The planet carrier assembly member 1436 has a plurality of intermeshing pinions 1437 and 1438 that are rotatably mounted on a carrier member 1439 and disposed in meshing relationship with the sun gear member 1432 and ring gear member 1434, respectively.

The planetary gearset 1440 includes a sun gear member 1442, a ring gear member 1444 and a planet carrier assembly member 1446. The planet carrier assembly member 1446 includes a plurality of intermeshing pinion gears 1447 and 1448 that are rotatably disposed on a planet carrier assembly member 1449 and disposed in meshing relationship with the sun gear member 1442 and the ring gear member 1444, respectively.

The sun gear member 1422 is continuously connected with the input shaft 17, the ring gear member 1444 is continuously connected with the output shaft 19, and the ring gear member 1424 is continuously connected with the transmission housing 60. The planet carrier assembly member 1426 and ring gear member 1434 are continuously interconnected through an interconnecting member 1470. The sun gear member 1442 and the planet carrier assembly member 1436 are continuously interconnected through an interconnecting member 1472. The sun gear member 1422 and input shaft 17 are selectively connectible with the interconnecting member 1472 through the torque-transmitting mechanism 1450 and with the planet carrier assembly member 1446 through the torque-transmitting mechanism 1452. The ring gear member 1444 and output shaft 19 are selectively connectible with the sun gear member 1432 through the torque-transmitting mechanism 1454. The sun gear member 1432 is selectively connectible with the planet carrier assembly member 1446 through the torque-transmitting mechanism 1456 and with the transmission housing 60 through the torque-transmitting mechanism 1458.

As seen in the truth table in FIG. 30, the planetary gear arrangement 1418 is controlled by the torque-transmitting mechanisms to provide a reverse speed ratio and seven forward speed ratios. It should also be noted that the torque-transmitting mechanism 1450 can remain engaged through the neutral condition thereby simplifying the forward/reverse interchange. It is also evident from the truth table that all of the single step forward interchanges, as well as the double step forward interchanges, are of the single transition variety. The truth table provides an example of numerical ratios that are available with the planetary gear arrangement 1418. These numerical values have been determined utilizing the ring gear/sun gear tooth ratios also given in FIG. 30. The R1/S1 value is the tooth ratio of the planetary gearset 1420; the R2/S2 value is the tooth ratio of the planetary gearset 1430; and the R3/S3 value is the tooth ratio of the planetary gearset 1440. Also provided in FIG. 30 is a chart describing the ratio steps between adjacent forward speed ratios as well as between the reverse to forward interchange.

Those skilled in the art will recognize that the numerical value of the reverse speed ratio is determined by the tooth ratios of the planetary gearsets 1420 and 1430. The numerical value of the forward speed ratios, with the exception of the third ratio and the seventh ratio, are determined utilizing the tooth ratios of all three planetary gearsets 1440, 1430 and 1420. The numerical value of the third forward speed ratio is determined utilizing the ring gear/sun gear tooth ratio of the planetary gearset 1420. The seventh forward speed ratio is a 1:1 ratio or direct drive.

Figures 31, 32:
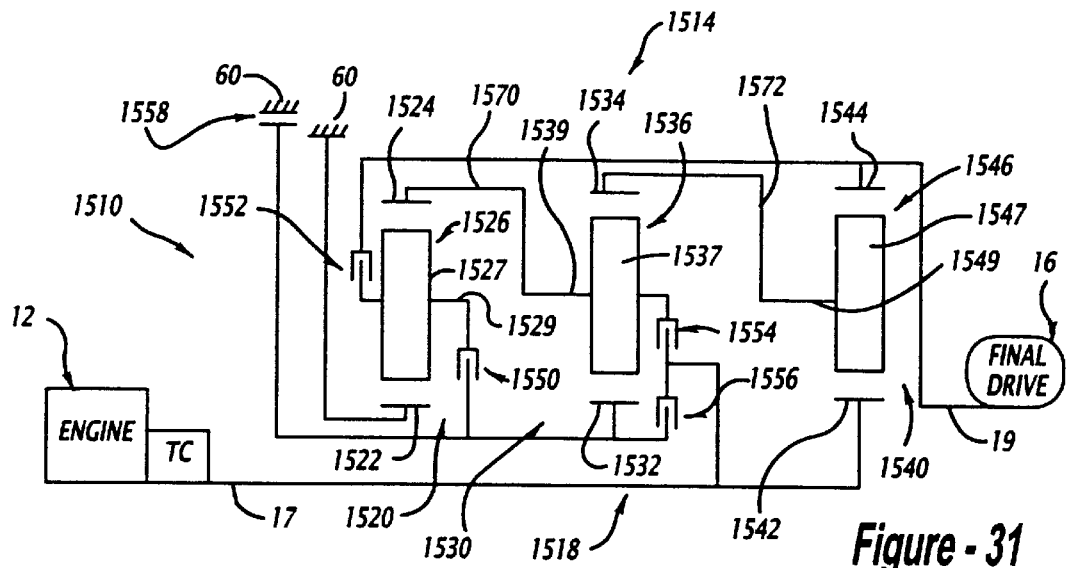
FIG. 31 is a schematic representation of a powertrain having a planetary transmission incorporating another family member of the present invention.
FIG. 32 is a truth table and chart depicting some of the operating characteristics of the powertrain shown in FIG. 31.

A powertrain 1510, shown in FIG. 31, includes an engine and torque converter 12, a planetary transmission 1514, and the final drive mechanism 16. A planetary gear arrangement 1518 includes input shaft 17 connected with the engine and torque converter 12, output shaft 19 connected with the final drive mechanism 16, three planetary gearsets 1520, 1530 and 1540, and five torque-transmitting mechanisms 1550, 1552, 1554, 1556 and 1558. The torque-transmitting mechanism 1558 is of the stationary type, commonly termed a brake, and the remaining torque-transmitting mechanisms are of the rotating type, commonly termed clutches.

The planetary gearset 1520 includes a sun gear member 1522, a ring gear member 1524, and a planet carrier assembly member 1526 that has a plurality of pinion gears 1527 rotatably mounted on a carrier member 1529 and disposed in meshing relationship with both the sun gear member 1522 and the ring gear member 1524.

The planetary gearset 1530 includes a sun gear member 1532, a ring gear member 1534, and a planet carrier assembly member 1536 that has a plurality of pinion gears 1537 rotatably disposed on a carrier member 1539 and meshing with both the sun gear member 1532 and the ring gear member 1534.

The planetary gearset 1540 includes a sun gear member 1542, a ring gear member 1544, and a planet carrier assembly member 1546 that has a plurality of pinion gears 1547 rotatably disposed on a carrier member 1549 and meshing with both the sun gear member 1542 and the ring gear member 1544.

The sun gear member 1542 is continuously connected with the input shaft 17, the ring gear member 1544 is continuously connected with output shaft 19, and the sun gear member 1522 is continuously connected with the transmission housing 60. The sun gear member 1542 and input shaft 17 are selectively connectible with the sun gear member 1532 through the torque-transmitting mechanism 1556 and with both the planet carrier assembly member 1536 and the ring gear member 1524 through the torque-transmitting mechanism 1554. The ring gear member 1524 and planet carrier assembly member 1536 are continuously interconnected by an interconnecting member 1570. The planet carrier assembly member 1546 and ring gear member 1534 are continuously interconnected by an interconnecting member 1572. The planet carrier assembly member 1526 is selectively connectible with the ring gear member 1544 and output shaft 19 through the torque-transmitting mechanism 1552 and with the sun gear member 1532 through the torque-transmitting mechanism 1550. The sun gear member 1532 is selectively connectible through transmission housing 60 through the torque-transmitting mechanism 1558.

The truth table shown in FIG. 32 defines the engagement sequence and the engagement combinations of the torque-transmitting mechanisms of the planetary gear arrangement 1518 that will provide the reverse speed ratio and eight forward speed ratios. The truth table also provides an example of the ratio numbers that are available with the planetary gear arrangement 1518 utilizing the example ring gear/sun gear tooth ratios that are also given in FIG. 32. The R1/S1 value is the tooth ratio of the planetary gearset 1520; the R2/S2 value is the tooth ratio of the planetary gearset 1530; and the R3/S3 value is the tooth ratio of the planetary gearset 1540. The chart of FIG. 32 provides samples of numerical values of the ratio steps between adjacent forward speed ratios and the ratio step between reverse and first. The chart provides the ratio steps for a six-speed, seven-speed, and eight-speed transmission. These values are also determined utilizing the sample tooth ratios set forth in FIG. 32.

Those skilled in the art will recognize that the numerical value of the reverse speed ratio is determined utilizing the ring gear/sun gear tooth ratio of the planetary gearset 1540. The first, second and third forward speed ratios have numerical values determined utilizing the tooth ratios of the planetary gearsets 1520, 1530 and 1540. The fourth forward speed ratio has a numerical value determined utilizing the ring gear/sun gear tooth ratio of the planetary gearset 1520. The fifth forward speed ratio is a 1:1 or direct drive. The sixth forward speed ratio has a numerical value determined utilizing the tooth ratios of the planetary gearsets 1520, 1530 and 1540. The seventh forward speed ratio has a numerical value determined utilizing the tooth ratios of the planetary gearsets 1530 and 1540. The eighth forward speed ratio has a numerical value determined utilizing the tooth ratios of all three planetary gearsets 1520, 1530 and 1540.

What is claimed is:

1. A multi-speed transmission comprising:

an input shaft;

an output shaft;

first, second, and third planetary gear sets each having first, second, and third members;

said input shaft being continuously interconnected with said first or third member of said first planetary gearset, or one of said members of said second or third planetary gear sets, said output shaft being continuously interconnected with another one of said members of said planetary gear sets that is not continuously interconnected with said input shaft;

a first interconnecting member continuously interconnecting said first member of said first planetary gear set and said first member of said second planetary gear set;

a second interconnecting member continuously interconnecting said second member of said second planetary gear set and said first member of said third planetary gear set;

a stationary transmission housing continuously connected with said second member of said first planetary gear set;

a first torque transmitting mechanism selectively interconnecting said transmission housing with one of said first interconnecting member, said third member of said first planetary gearset, said third member of said second or third planetary gearsets, that is not continuously interconnected with said input shaft or said output shaft;

a second torque transmitting mechanism selectively interconnecting said third member of said first planetary gear set with either said input shaft, said output shaft, said third member of said second planetary gear set, or said second member of said third planetary gear set;

a third torque transmitting mechanism selectively interconnecting said first or third member of said first planetary gearset, or said third member of said second planetary gear set with, one of said members, of said third planetary gear set, said members interconnected by said third torque-transmitting mechanism being different from at least one of the members interconnected by said second torque-transmitting mechanism;

a fourth torque transmitting mechanism selectively interconnecting said first or third member of said first planetary gear set, or said third member of said second planetary gear set with either said second or third member of said third planetary gear set said members interconnected by said fourth torque-transmitting mechanism being different from at least one of the members interconnected by said second or third torque-transmitting mechanism;

a fifth torque transmitting mechanism selectively interconnecting one of said members of said third planetary gear set with either said first interconnecting member, said third member of said first planetary gear set, said third member of said second planetary gear set, or another member of said third planetary gear set, said members interconnected by said fifth torque-transmitting mechanism being different from at least one of the members interconnected by said second, or third, or fourth torque-transmitting mechanism; and said torque transmitting mechanisms being engaged in combinations of two to establish at least six forward speed ratios and a reverse ratio between said input shaft and said output shaft.

2. The multi-speed transmission defined in claim 1 further wherein:

said torque transmitting mechanisms are selectively engaged in combinations of two to establish at least seven forward speed ratios and a reverse ratio.

3. The multi-speed transmission defined in claim 1 further wherein:

said torque transmitting mechanisms are selectively engaged in combinations of two to establish at least eight forward speed ratios and a reverse speed ratio.

4. A multi-speed transmission comprising:

an input shaft;

an output shaft;

a planetary gear arrangement having first, second, and third planetary gear sets, each planetary gear sets having first, second, and third members;

a first interconnecting member continuously interconnecting said first member of said first planetary gear set with said first member of said second planetary gear set;

a second interconnecting member continuously interconnecting said second member of said second planetary gear set with said first member of said third planetary gear set;

said input shaft being continuously interconnected with said first or third member of said first planetary gearset or one of said members of said second or third planetary gearsets;

said output shaft being continuously interconnected with another one of said members of said planetary gearsets that is not continuously interconnected with said input shaft;

a transmission housing continuously interconnected with said second member of said first planetary gear set; and five selectively engageable torque transmitting mechanisms for selectively interconnecting said members of said planetary gear sets with said input shaft, said output shaft, said transmission housing, or another member of one of the planetary gear sets, said torque transmitting mechanism being engaged in combination of two to establish six forward ratios and one reverse ratio between said input shaft and said output shaft.

5. The multi-speed transmission defined in claim 4 further comprising:

a first of said torque transmitting mechanism means being selectively operable for interconnecting said third member of said first or third planetary gear set with either said first interconnecting member, said second interconnecting member, said second member of said third planetary gear set, or said third member of said second planetary gear set.

6. The multi-speed transmission defined in claim 4 further comprising:

a second of said torque transmitting mechanism means being selectively operable for interconnecting one of said third member of said first planetary gear set, said second member of said third planetary gear set, and said third member of said third planetary gear set with one of said input shaft, said output shaft, and a member of said second planetary gear set.

7. The multi-speed transmission defined in claim 4 further comprising:

a third of said torque transmitting mechanism means being selectively operable for interconnecting one of said input shaft, said output shaft, and said third member of said third planetary gear set with one of said first interconnecting member, said second interconnecting member, and said third member of one of said first or second planetary gear sets.

8. The multi-speed transmission defined in claim 4 further comprising:

a fourth of said torque transmitting mechanism means being selectively operable for interconnecting one of said input shaft and said output shaft with one of said second interconnect member, said third member of one of said planetary gear sets, and said second member of said third planetary gear set.

9. The multi-speed transmission defined in claim 4 further comprising:

a fifth of said torque transmitting mechanism means being selectively operable for interconnecting said transmission housing with one of said third member of one of said planetary gear sets and said first interconnecting member.

10. A multi-speed transmission comprising:

an input shaft;

an output shaft;

a planetary gear arrangement having first, second, and third planetary gear sets, each planetary gear sets having first, second, and third members;

a first interconnecting member continuously interconnecting said first member of said first planetary gear set with said first member of said second planetary gear set;

a second interconnecting member continuously interconnecting said second member of said second planetary gear set with said first member of said third planetary gear set;

said input shaft being continuously interconnected with said first or third member of said first planetary gearset or one of said members of said second or third planetary gearsets;

said output shaft being continuously interconnected with another one of said members of said planetary gearsets that is not continuonsly interconnected with said input shaft;

a transmission housing continuously interconnected with said second member of said first planetary gear set; and said five rotating torque-transmitting mechanisms being selectively engaged in pairs to establish combinations of members joined for common rotation including either.

said first torque-transmitting mechanism selectively interconnecting said third member of said first planetary gearset with said third member of said second planetary gearset, said second torque-transmitting mechanism selectively interconnecting said input shaft with said second interconnecting member, said third torque-transmitting mechanism selectively interconnecting said input shaft with said third member of said second planetary gearset, said fourth torque-transmitting mechanism selectively interconnecting said third member of said second planetary gearset with said third member of said third planetary gearset, and said fifth torque-transmitting mechanism selectively interconnecting said transmission housing with said third member of said third planetary gearset, or said first torque-transmitting mechanism selectively interconnecting said third member of said first planetary gearset with said second interconnecting member, said second torque-transmitting mechanism selectively interconnecting said third member of said first planetary gearset with said third member of said third planetary gearset, said third torque-transmitting mechanism selectively interconnecting said third member of said third planetary gearset with said second interconnecting member, said fourth torque-transmitting mechanism selectively interconnecting said input shaft with said third member of said third planetary gearset, and said fifth torque-transmitting mechanism selectively interconnecting said transmission housing with said third member of said first planetary gearset; or said first torque-transmitting mechanism selectively interconnecting said third member of said first planetary gearset with said second interconnecting member, said second torque-transmitting mechanism selectively interconnecting said third member of said first planetary gearset with said second member of said third planetary gearset, said third torque-transmitting mechanism selectively interconnecting said input shaft with said second member of said third planetary gearset, said fourth torque-transmitting mechanism selectively interconnecting said output shaft with said second member of said third planetary gearset, and said fifth torque-transmitting mechanism selectively interconnecting said transmission housing with said first interconnecting member; or said first torque-transmitting mechanism selectively interconnecting said third member of said first planetary gearset with said second interconnecting member, said second torque-transmitting mechanism selectively interconnecting said input shaft with said third member of said first planetary gearset, said third torque-transmitting mechanism selectively interconnecting said third member of said first planetary gearset with said second member of said third planetary gearset, said fourth torque-transmitting mechanism selectively interconnecting said output shaft with said third member of said first planetary gearset, and said fifth torque-transmitting mechanism selectively interconnecting said transmission housing with said second member of said third planetary gearset; or said first torque-transmitting mechanism selectively interconnecting said third member of said first planetary gearset with said second member of said third planetary gearset, said second torque-transmitting mechanism selectively interconnecting said second member of said third planetary gearset with said first interconnecting member, said third torque-transmitting mechanism selectively interconnecting said input shaft with said third member of said third planetary gearset, said fourth torque-transmitting mechanism selectively interconnecting said output shaft with said second member of said second planetary gearset, and said fifth torque-transmitting mechanism selectively interconnecting said transmission housing with said third member of said third planetary gearset; or said first torque-transmitting mechanism selectively interconnecting said third member of said first planetary gearset with said second member of said third planetary gearset, said second torque-transmitting mechanism selectively interconnecting said second member of said third planetary gearset with said first interconnecting member, said third torque-transmitting mechanism selectively interconnecting said input shaft with said third member of said third planetary gearset, said fourth torque-transmitting mechanism selectively interconnecting said output shaft with said second member of said third planetary gearset, and said fifth torque-transmitting mechanism selectively interconnecting said transmission housing with said third member of said third planetary gearset; or said first torque-transmitting mechanism selectively interconnecting said third member of said first planetary gearset with said second interconnecting member, said second torque-transmitting mechanism selectively interconnecting said second member of said third planetary gearset with said third member of said first planetary gearset, said third torque-transmitting mechanism selectively interconnecting said input shaft with said second member of said third planetary gearset, said fourth torque-transmitting mechanism selectively interconnecting said output shaft with said second member of said third planetary gearset, and said fifth torque-transmitting mechanism selectively interconnecting said transmission housing with said third member of said first planetary gearset; or said first torque-transmitting mechanism selectively interconnecting said third member of said first planetary gearset with said second interconnecting member, said second torque-transmitting mechanism selectively interconnecting said third member of said first planetary gearset with said second member of said third planetary gearset, said third torque-transmitting mechanism selectively interconnecting said input shaft with said second member of said third planetary gearset, said fourth torque-transmitting mechanism selectively interconnecting said output shaft with said second member of said third planetary gearset, and said fifth torque-transmitting mechanism selectively interconnecting said transmission housing with said first interconnecting member; or said first torque-transmitting mechanism selectively interconnecting said third member of said first planetary gearset with said third member of said second planetary gearset, said second torque-transmitting mechanism selectively interconnecting said third member of said first planetary gearset with said second member of said third planetary gearset, said third torque-transmitting mechanism selectively interconnecting said third member of said second planetary gearset with said second member of said third planetary gearset, said fourth torque-transmitting mechanism selectively interconnecting said output shaft with said third member of said second planetary gearset, and said fifth torque-transmitting mechanism selectively interconnecting said transmission housing with said third member of said first planetary gearset, or said first torque-transmitting mechanism selectively interconnecting said third member of said first planetary gearset with said third member of said second planetary gearset, said second torque-transmitting mechanism selectively interconnecting said third member of said first planetary gearset with said second member of said third planetary gearset, said third torque-transmitting mechanism selectively interconnecting said third member of said second planetary gearset with said second member of said third planetary gearset, said fourth torque-transmitting mechanism selectively interconnecting said output shaft with said third member of said second planetary gearset, said fifth torque-transmitting mechanism selectively interconnecting said transmission housing with said first interconnecting member; or said first torque-transmitting mechanism selectively interconnecting said third member of said first planetary gearset with said input shaft, said second torque-transmitting mechanism selectively interconnecting said second member of said third planetary gearset with said first: interconnecting member, said third torque-transmitting mechanism selectively interconnecting said second interconnecting member with said output shaft, said forth torque-transmitting mechanism selectively interconnecting said input shaft with said second interconnecting member, and said fifth torque-transmitting mechanism selectively interconnecting said transmission housing with said second member of said third planetary gearset; or said first torque-transmitting mechanism selectively interconnecting said third member of said first planetary gearset with said third member of said second planetary gearset, said second torque-transmitting mechanism selectively interconnecting said first interconnecting member with said second interconnecting member, said third torque-transmitting mechanism selectively interconnecting said third member of said second planetary gearset with said second member of said third planetary gearset, said fourth torque-transmitting mechanism selectively interconnecting said output shaft with said third member of said second planetary gearset, and said fifth torque-transmitting mechanism selectively interconnecting said transmission housing with said second member of said third planetary gearset; or said first torque-transmitting mechanism selectively interconnecting said third member of said first planetary gearset with said second interconnecting member, said second torque-transmitting mechanism selectively interconnecting said third member of said first planetary gearset with said second member of said third planetary gearset, said third torque-transmitting mechanism selectively interconnecting said second member of said third planetary gearset with said first interconnecting member, said fourth torque-transmitting mechanism selectively interconnecting said output shaft with said first interconnecting member, and said fifth torque-transmitting mechanism selectively interconnecting said transmission housing with said second member of said third planetary gearset; or said first torque-transmitting mechanism selectively interconnecting said third member of said first planetary gearset with said input shaft, said second torque-transmitting mechanism selectively interconnecting said third member of said first planetary gearset with said output shaft, said third torque-transmitting mechanism selectively interconnecting said third member of said third planetary gearset with said first interconnecting member, said fourth torque-transmitting mechanism selectively interconnecting said third member of said third planetary gearset with said input shaft, and said fifth torque-transmitting mechanism selectively interconnecting said transmission housing with said third member of said third planetary gearset;

said first torque-transmitting mechanism selectively interconnecting said input shaft with said second interconnecting member, said second torque-transmitting mechanism selectively interconnecting said input shaft with said second member of said third planetary gearset, said third torque-transmitting mechanism selectively interconnecting said output shaft with said third member of said second planetary gearset, said fourth torque-transmitting mechanism selectively interconnecting said third member of said second planetary gearset with said second member of said third planetary gearset, and said fifth torque-transmitting mechanism selectively interconnecting said transmission housing with said third member of said second planetary gearset; or said first torque-transmitting mechanism selectively interconnecting said third member of said first planetary gearset with said third member of said second planetary gearset, said second torque-transmitting mechanism selectively interconnecting said third member of said first planetary gearset with said output shaft, said third torque-transmitting mechanism selectively interconnecting said input shaft with said second interconnecting member, said fourth torque-transmitting mechanism selectively interconnecting said input shaft with said third member of said second planetary gearset, and said fifth torque-transmitting mechanism selectively interconnecting said transmission housing with said third member of said second planetary gearset.

* * * * *